(12) United States Patent
Yanagida et al.

(10) Patent No.: US 11,078,967 B2
(45) Date of Patent: Aug. 3, 2021

(54) VEHICLE TRANSMISSION AND CONTROL DEVICE FOR VEHICLE TRANSMISSION

(71) Applicant: TOYOTA JIDOSHA KABUSHIKI KAISHA, Toyota (JP)

(72) Inventors: Tomoaki Yanagida, Susono (JP); Yukihiro Inaba, Nisshin (JP); Junichi Kato, Toyota (JP); Tomoyuki Kano, Toyota (JP); Tomomitsu Terakawa, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/780,958

(22) Filed: Feb. 4, 2020

(65) Prior Publication Data

US 2020/0256400 A1 Aug. 13, 2020

(30) Foreign Application Priority Data

Feb. 13, 2019 (JP) .............................. JP2019-023968
Oct. 8, 2019 (JP) .............................. JP2019-185535

(51) Int. Cl.
*F16D 21/04* (2006.01)
*F16D 48/06* (2006.01)
*F16H 3/091* (2006.01)
*F16D 41/14* (2006.01)
*F16H 63/30* (2006.01)
*F16H 3/08* (2006.01)
(Continued)

(52) U.S. Cl.
CPC .............. *F16D 21/04* (2013.01); *F16D 41/14* (2013.01); *F16D 48/068* (2013.01); *F16H 3/0915* (2013.01); *F16H 63/304* (2013.01); *F16D 11/10* (2013.01); *F16H 63/18* (2013.01); *F16H 2003/0811* (2013.01); *F16H 2063/3059* (2013.01); *F16H 2063/3093* (2013.01); *F16H 2200/0052* (2013.01)

(58) Field of Classification Search
CPC ........ F16D 21/04; F16D 48/068; F16D 11/10; F16D 11/14; F16H 63/30; F16H 63/304; F16H 63/32; F16H 63/18; F16H 2200/0052; F16H 2063/3059; F16H 2063/3093; F16H 3/0915; F16H 2009/0811
See application file for complete search history.

(56) References Cited

U.S. PATENT DOCUMENTS 3,772,933 A * 11/1973 Prenzel ............. B60W 30/1819
74/335
3,872,737 A * 3/1975 Thomas .................. F16D 11/10
74/339

(Continued)

FOREIGN PATENT DOCUMENTS

JP 2018-044613 A 3/2018

*Primary Examiner* — Timothy Hannon
(74) *Attorney, Agent, or Firm* — Oliff PLC

(57) ABSTRACT

A vehicle transmission includes a shaft; speed-changing gears; switching mechanisms; and a shifting mechanism. The shifting mechanism is provided with a double-meshing preventing mechanism configured to switch between a one-way state in which the switching mechanisms are hindered from moving in a downshift direction and allowed to move in an upshift direction and a free state in which the switching mechanisms are allowed to move in both the downshift direction and the upshift direction.

6 Claims, 15 Drawing Sheets

(51) Int. Cl.
 *F16D 11/10* (2006.01)
 *F16H 63/18* (2006.01)

(56) References Cited

U.S. PATENT DOCUMENTS

2017/0051811 A1* 2/2017 Takeuchi ................ F16H 63/30
2018/0073635 A1  3/2018 Takeuchi et al.

* cited by examiner

VEHICLE TRANSMISSION AND CONTROL DEVICE FOR VEHICLE TRANSMISSION

CROSS-REFERENCE TO RELATED APPLICATION

This application claims priority to Japanese Patent Application No. 2019-023968 filed on Feb. 13, 2019 and Japanese Patent Application No. 2019-185535 filed on Oct. 8, 2019, incorporated herein by reference in their entireties.

BACKGROUND

1. Technical Field

The disclosure relates to preventing double meshing in a vehicle transmission so as to reduce the likelihood of torque interruption during a gear change.

2. Description of Related Art

A vehicle transmission that is provided in a vehicle and can reduce the likelihood of torque interruption that occurs during a transition period of a gear change has been proposed. That is the vehicle transmission of Japanese Patent Application Publication No. 2018-44613 (JP 2018-44613A). The vehicle transmission described in JP 2018-44613A) is provided with a plurality of switching mechanisms that connects and disconnects a shaft to and from a plurality of speed-changing gears provided on the shaft so as to be able to rotate relatively to the shaft. When the switching mechanism is moved by a shifting mechanism toward the speed-changing gear in an axial direction of the shaft, gear-side meshing teeth formed in the speed-changing gear and meshing teeth formed in the switching mechanism mesh with each other, causing the shaft and the speed-changing gear to rotate integrally.

The switching mechanism includes a first ring that is fitted on the shaft so as to be unable to rotate relatively to the shaft and able to move relatively to the shaft in the axial direction of the shaft, a second ring that is fitted on the shaft so as to be unable to rotate relatively to the shaft and able to move relatively to the shaft in the axial direction of the shaft, and springs that are interposed between the first ring and the second ring and exert an urging force in a direction in which these rings are drawn toward each other. The meshing teeth of the switching mechanism include first meshing teeth that protrude from the first ring toward the speed-changing gear and are capable of meshing with the gear-side meshing teeth of the speed-changing gear, and second meshing teeth that protrude from the second ring toward the speed-changing gear by passing through the first ring and are capable of meshing with the gear-side meshing teeth of the speed-changing gear.

During a transition period of a gear change, one of the switching mechanisms (hereinafter, a first switching mechanism) that connects and disconnects one of the speed-changing gears that forms a gear stage before a gear change (hereinafter, a before-change speed-changing gear) to and from the shaft is moved in a direction away from the speed-changing gear in the axial direction of the shaft, while another of the switching mechanisms (hereinafter, a second switching mechanism) that connects and disconnects another of the speed-changing gears that forms a gear stage after a gear change (hereinafter, an after-change speed-changing gear) to and from the shaft is moved toward the speed-changing gear in the axial direction of the shaft. Thus, the vehicle transmission is shifted as the gear-side meshing teeth of the before-change speed-changing gear and the meshing teeth of the first switching mechanism come out of mesh while the gear-side meshing teeth of the after-change speed-changing gear and the meshing teeth of the second switching mechanism mesh with each other.

Here, each switching mechanism includes the first ring, the second ring, and the springs. When the first switching mechanism that connects and disconnects the before-change speed-changing gear to and from the shaft is moved in the direction away from the before-change speed-changing gear during a transition period of a gear change, the second ring of the first switching mechanism moves in the direction away from the before-change speed-changing gear, while the first meshing teeth of the first ring and the gear-side meshing teeth of the before-change speed-changing gear are kept in mesh by the elastically deforming springs. When the meshing teeth of the second switching mechanism that connects and disconnects the after-change speed-changing gear to and from the shaft and the gear-side meshing teeth of the after-change speed-changing gear mesh with each other, and the second switching mechanism switches to a state in which power transmission is allowed between the shaft and the after-change speed-changing gear, the gear-side meshing teeth of the before-change speed-changing gear and the meshing teeth of the first switching mechanism come out of mesh, and the first ring of the first switching mechanism is moved toward the second ring by the elastic force of the springs. In this way, the shaft and the before-change speed-changing gear remain connected to each other by the first switching mechanism until the second switching mechanism switches to the state in which power transmission is allowed between the shaft and the after-change speed-changing gear. Thus, the likelihood of torque interruption that occurs during a transition period of a gear change is reduced.

SUMMARY

The shifting mechanism that moves the switching mechanism in the axial direction of the shaft includes a plurality of shifting forks each of which is fitted in an annular groove formed between the first ring and the second ring of the corresponding switching mechanism, a barrel including a plurality of shift grooves defining the positions of the shifting forks, and an actuator that rotates the barrel. The shifting forks are respectively engaged with the shift grooves formed in the barrel, and as the barrel rotates, each shifting fork is moved along the shape of the shift groove. The shape of the shift groove is set such that when the barrel rotates in one direction, the transmission is upshifted sequentially by one stage at a time, and that when the barrel rotates in the other direction, the transmission is downshifted sequentially by one stage at a time. Here, if the barrel rotates accidentally in the downshift direction due to, for example, failure of the actuator that rotates the barrel or malfunction of an electronic control unit that controls the operation of the actuator, or if the barrel rotates to a rotation position at which the switching mechanism that is to be switched to the connected state is switched to the connected state before the switching mechanism that is to be switched to the disconnected state during a downshift is switched to the disconnected state, double meshing may occur in which the gear-side meshing teeth of two speed-changing gears mesh with the meshing teeth of the switching mechanisms at the same time.

The disclosure provides a vehicle transmission that can prevent double meshing that occurs when a barrel of a shifting mechanism rotates accidentally in the downshift direction, or when the barrel rotates to a rotation position at which a switching mechanism that is to be switched to a connected state is switched to the connected state before a switching mechanism that is to be switched to a disconnected state during a downshift is switched to the disconnected state. The disclosure further provides a control device for this vehicle transmission.

A first aspect of the disclosure relates to a vehicle transmission. (a) The vehicle transmission includes a shaft; a plurality of speed-changing gears provided on the shaft so as to be able to rotate relatively to the shaft; a plurality of switching mechanisms each of which is disposed at a position adjacent to a corresponding one of the speed-changing gears in an axial direction of the shaft and configured to switch between a connected state in which the corresponding speed-changing gear and the shaft rotate integrally and a disconnected state in which the corresponding speed-changing gear and the shaft rotate relatively to each other; and a shifting mechanism that applies an operating force for moving the switching mechanisms in the axial direction of the shaft. The vehicle transmission is shifted to a plurality of gear stages according to positions of the switching mechanisms. (b) Each of the speed-changing gears includes a plurality of gear-side meshing teeth provided on a surface facing a corresponding one of the switching mechanisms in the axial direction of the shaft. (c) Each of the switching mechanisms includes a first ring that is provided on the shaft so as to be unable to rotate relatively to the shaft and able to move relatively to the shaft in the axial direction of the shaft, a second ring that is provided on the shaft so as to be unable to rotate relatively to the shaft and able to move relatively to the shaft in the axial direction of the shaft, and a spring that is interposed between the first ring and the second ring in the axial direction of the shaft and exerts an urging force in a direction in which the first ring and the second ring are drawn toward each other. (d) The first ring is disposed at a position adjacent to the corresponding speed-changing gear in the axial direction of the shaft, and the second ring is disposed at a position separated from the corresponding speed-changing gear by the first ring in the axial direction of the shaft. (e) The first ring includes first meshing teeth that protrude toward the corresponding speed-changing gear from a surface facing the corresponding speed-changing gear in the axial direction of the shaft and are configured to mesh with the gear-side meshing teeth. (f) The second ring includes second meshing teeth that protrude toward the corresponding speed-changing gear from a surface facing the corresponding speed-changing gear in the axial direction of the shaft by passing through the first ring and are configured to mesh with the gear-side meshing teeth. (g) The shifting mechanism is provided with a double-meshing preventing mechanism configured to switch between a one-way state in which the switching mechanisms are hindered from moving in a downshift direction and allowed to move in an upshift direction and a free state in which the switching mechanisms are allowed to move in both the downshift direction and the upshift direction.

In the vehicle transmission according to the above aspect, the double-meshing preventing mechanism, when switched to the one-say state, hinders the switching mechanism from moving in the downshift direction even when the shifting mechanism operates accidentally in the downshift direction during travel due to failure of, for example, an actuator that operates the shifting mechanism. Thus, double meshing resulting from the switching mechanism moving in the downshift direction can be prevented. When the transmission is to be downshifted, the double-meshing preventing mechanism is switched to the free state to allow a downshift, so that the transmission can be downshifted.

In the vehicle transmission according to the above aspect, (a) The double-meshing preventing mechanism may include a ratchet tooth provided in the shifting mechanism and a stopper member configured to come into contact with the ratchet tooth. (b) The stopper member may be configured to switch between a first position in which the ratchet tooth and the stopper member come into contact with each other and a second position in which the ratchet tooth and the stopper member do not come into contact with each other. (c) The double-meshing preventing mechanism may be switched to the one-way state when the stopper member is switched to the first position. (d) The ratchet tooth and the stopper member may be configured to come into contact with each other when the shifting mechanism operates in a direction of moving the switching mechanisms toward a downshift side in a state where the double-meshing preventing mechanism is switched to the one-way state.

In this configuration, the stopper member of the double-meshing preventing mechanism is located in the first position, and therefore the ratchet tooth and the stopper member can come into contact with each other, in the state where the double-meshing preventing mechanism is switched to the one-way state. Thus, even when the shifting mechanism operates accidentally in the direction of moving the switching mechanisms in the downshift direction in the state where the double-meshing preventing mechanism is switched to the one-way state, double meshing is prevented as the ratchet tooth and the stopper member come into contact with each other and thereby hinder the switching mechanisms from moving in the downshift direction.

In the vehicle transmission according to the above aspect, (a) the shifting mechanism may be provided so as to be rotatable, and may include a barrel having shift grooves defining positions of shifting forks that are respectively fitted to the switching mechanisms, a pinion provided on the barrel, and a rack including teeth that mesh with the pinion, and (b) the ratchet tooth may be provided in the barrel.

In this configuration, when the shifting mechanism operates accidentally in the direction of moving the switching mechanisms toward the downshift side in the state where the double-meshing preventing mechanism is switched to the one-way state, double meshing is prevented as the stopper member comes into contact with the ratchet tooth provided in the barrel and thereby hinders the switching mechanisms from moving in the downshift direction.

In the vehicle transmission according to the above aspect, (a) the shifting mechanism may be provided so as to be rotatable, and may include a barrel having shift grooves defining positions of shifting forks that are respectively fitted to the switching mechanisms, a pinion provided on the barrel, and a rack having teeth that mesh with the pinion, and (b) the ratchet tooth may be provided in the rack.

In this configuration, when the shifting mechanism operates accidentally in the direction of moving the switching mechanisms toward the downshift side in the state where the double-meshing preventing mechanism is switched to the one-way state, double meshing is prevented as the stopper member comes into contact with the ratchet tooth provided in the rack and thereby hinders the switching mechanisms from moving in the downshift direction.

In the vehicle transmission according to the above aspect, power transmission between the shaft and the speed-changing gears may be interrupted when the stopper member and the ratchet tooth of the double-meshing preventing mechanism are in contact with each other.

In this configuration, power transmission between the shaft and the speed-changing gears is interrupted when the ratchet tooth and the stopper member of the double-meshing preventing mechanism are in contact with each other. Therefore, for example, when failure in which a clutch disposed between a driving source and the vehicle transmission seizes up in an engaged position occurs, power transmission in the vehicle transmission can be easily interrupted by operating the shifting mechanism in the downshift direction so as to bring the ratchet tooth and the stopper member into contact with each other.

In the vehicle transmission according to the above aspect, (a) the shifting mechanism may be provided with a detent mechanism that restricts a rotation position of the barrel to a position corresponding to any one of the plurality of gear stages. (b) The detent mechanism may include a detent plate with a detent surface having a shape of a periodically changing wave, and a pressing member that is pressed against the detent surface. (c) The pressing member may be pressed against a surface located closer to a downshift side than an apex provided in the detent surface is, when the stopper member and the ratchet tooth of the double-meshing preventing mechanism are in contact with each other.

In this configuration, the pressing member of the detent mechanism is pressed against the surface located closer to the downshift side than the apex provided in the detent surface is, when the ratchet tooth and the stopper member of the double-meshing preventing mechanism are in contact with each other. Thus, the shifting mechanism is urged by the detent mechanism in the direction of moving the switching mechanism toward the downshift side. As a result, the ratchet tooth and the stopper member can be mechanically held in contact with each other.

A second aspect of the disclosure relates to a control device for a vehicle transmission. (a) The vehicle transmission includes a shaft, a plurality of speed-changing gears provided on the shaft so as to be able to rotate relatively to the shaft, a plurality of switching mechanisms each of which is disposed at a position adjacent to a corresponding one of the speed-changing gears in an axial direction of the shaft and configured to switch between a connected state in which the corresponding speed-changing gear and the shaft rotate integrally and a disconnected state in which the corresponding speed-changing gear and the shaft rotate relatively to each other, and a shifting mechanism that applies an operating force for moving the switching mechanisms in the axial direction of the shaft. The vehicle transmission is shifted to a plurality of gear stages according to positions of the switching mechanisms. (b) Each of the speed-changing gears includes a plurality of gear-side meshing teeth provided on a surface facing a corresponding one of the switching mechanisms in the axial direction of the shaft. (c) Each of the switching mechanisms includes a first ring that is provided on the shaft so as to be unable to rotate relatively to the shaft and able to move relatively to the shaft in the axial direction of the shaft, a second ring that is provided on the shaft so as to be unable to rotate relatively to the shaft and able to move relatively to the shaft in the axial direction of the shaft, and a spring that is interposed between the first ring and the second ring in the axial direction of the shaft and exerts an urging force in a direction in which the first ring and the second ring are drawn toward each other. (d) The first ring is disposed at a position adjacent to the corresponding speed-changing gear in the axial direction of the shaft, and the second ring is disposed at a position separated from the corresponding speed-changing gear by the first ring in the axial direction of the shaft. (e) The first ring includes first meshing teeth that protrude toward the corresponding speed-changing gear from a surface facing the corresponding speed-changing gear in the axial direction of the shaft and are configured to mesh with the gear-side meshing teeth. (f) The second ring includes second meshing teeth that protrude toward the corresponding speed-changing gear from a surface facing the corresponding speed-changing gear in the axial direction of the shaft by passing through the first ring and are configured to mesh with the gear-side meshing teeth. (g) The shifting mechanism is provided with a double-meshing preventing mechanism configured to switch between a one-way state in which the switching mechanisms are hindered from moving in a downshift direction and allowed to move in an upshift direction and a free state in which the switching mechanisms are allowed to move in both the downshift direction and the upshift direction. (h) The control device includes an electronic control unit configured to determine whether one of the switching mechanisms that is to be switched to the disconnected state during a downshift has been switched to the disconnected state, and to switch the double-meshing preventing mechanism to the free state upon determining that the one switching mechanism has been switched to the disconnected state.

The control device for the vehicle transmission according to the above aspect switches the double-meshing preventing mechanism to the free state upon determining that the switching mechanism that is to be switched to the disconnected state during the downshift of the vehicle transmission has been switched to the disconnected state. Thus, double meshing during the downshift can be reliably prevented.

In the control device for the vehicle transmission according to the above aspect, the electronic control unit may be configured to switch the double-meshing preventing mechanism to the one-way state when another of the switching mechanisms that is to be switched to the connected state during the downshift is switched to the connected state.

In this configuration, the double-meshing preventing mechanism is switched to the one-way state when the switching mechanism that is to be switched to the connected state during the downshift of the vehicle transmission is switched to the connected state. Therefore, even when the shifting mechanism thereafter operates accidentally in the downshift direction, the downshift is hindered by the double-meshing preventing mechanism and double meshing can be reliably prevented.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the disclosure will be described in detail below with reference to the drawings. The drawings in the following embodiment are simplified or deformed as necessary, and the dimensional ratios, shapes, etc. of parts are not necessarily accurately represented.

Figure 1:
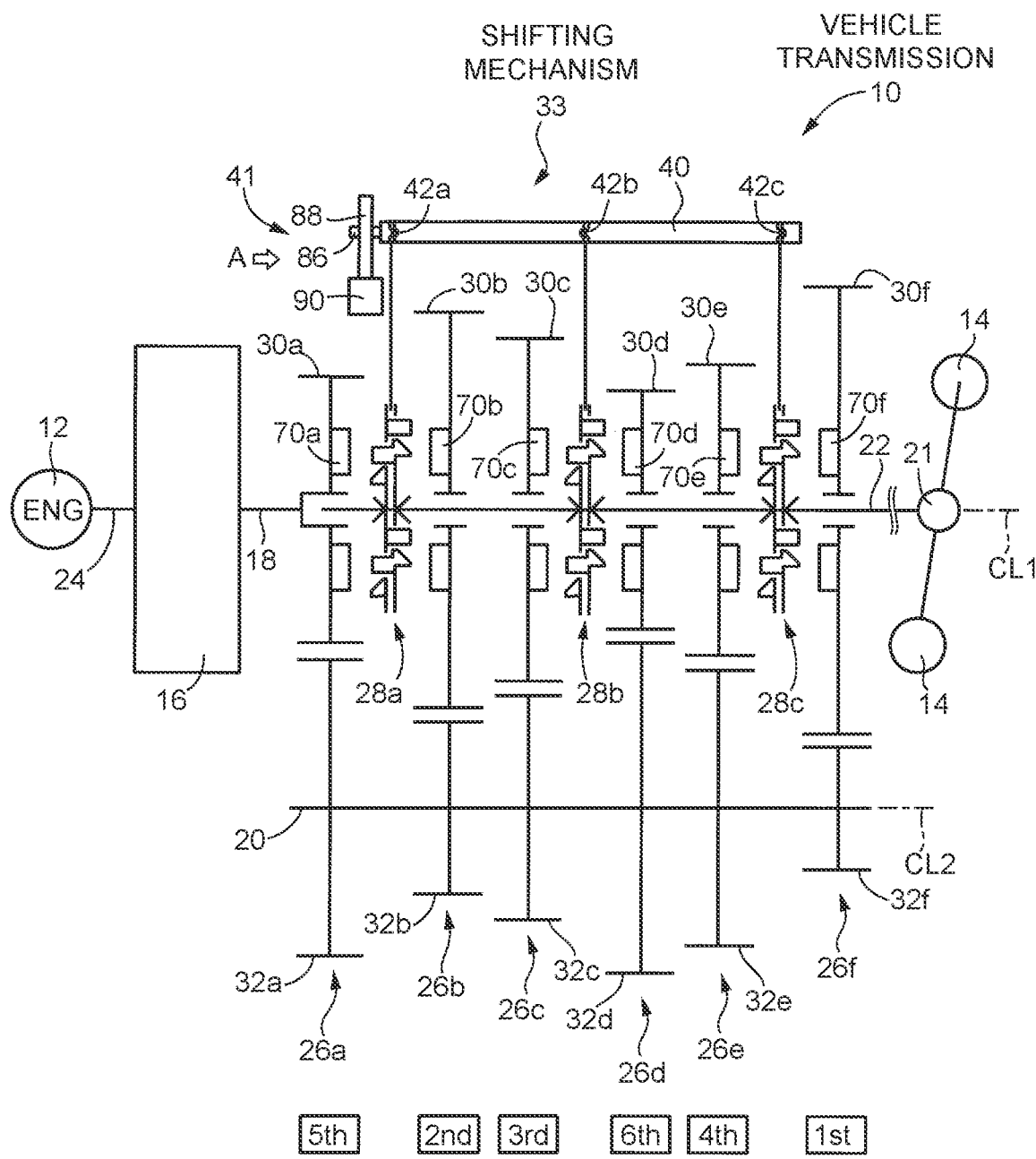
FIG. 1 is a skeleton diagram schematically showing the structure of a vehicle transmission to which the disclosure is applied.

FIG. 1 is a skeleton diagram schematically showing the structure of a vehicle transmission 10 (hereinafter referred to as a transmission 10) to which the disclosure is applied. The transmission 10 is a parallel two-shaft transmission that is provided on a power transmission path between an engine 12 and driving wheels 14 and establishes a plurality of gear stages by decreasing or increasing the speed of rotation input from the engine 12 at a predetermined gear ratio (shift ratio) γ.

The transmission 10 includes an input shaft 18 coupled to the engine 12 through a clutch 16 so as to be able to transmit power, a counter shaft 20 disposed parallel to the input shaft 18, and an output shaft 22 coupled to the driving wheels 14 through a differential mechanism 21 etc. so as to be able to transmit power. The input shaft 18 and the output shaft 22 are disposed in series on the same rotational axis CL1 as a rotational axis of a crankshaft 24 of the engine 12. The output shaft 22 is one example of the shaft of the disclosure.

The transmission 10 includes an input gear pair 26a, a second-speed gear pair 26b, a third-speed gear pair 26c, a sixth-speed gear pair 26d, a fourth-speed gear pair 26e, and a first-speed gear pair 26f, in this order from the engine 12 toward the driving wheels 14 in the direction of the rotational axis CL1.

The transmission 10 further includes: a first switching mechanism 28a that is disposed on the output shaft 22, at a position adjacent to an input gear 30a (to be described later) of the input gear pair 26a and a second-speed gear 30b (to be described later) of the second-speed gear pair 26b in an axial direction of the output shaft 22; a second switching mechanism 28b that is disposed at a position adjacent to a third-speed gear 30c (to be described later) of the third-speed gear pair 26c and a sixth-speed gear 30d (to be described later) of the sixth-speed gear pair 26d in the axial direction of the output shaft 22; and a third switching mechanism 28c that is disposed at a position adjacent to a fourth-speed gear 30e (to be described later) of the fourth-speed gear pair 26e and a first-speed gear 30f (to be described later) of the first-speed gear pair 26f in the axial direction of the output shaft 22.

The first switching mechanism 28a is a connecting-disconnecting mechanism configured to be able to switch between a connected state in which the input gear 30a or the second-speed gear 30b is connected to the output shaft 22 and one of the gears 30a, 30b and the output shaft 22 rotate integrally, and a disconnected in which the input gear 30a and the second-speed gear 30b are disconnected from the output shaft 22 and the gears 30a, 30b and the output shaft 22 rotate relatively to each other. The second switching mechanism 28b is a connecting-disconnecting mechanism configured to be able to switch between a connected state in which the third-speed gear 30c or the sixth-speed gear 30d is connected to the output shaft 22 and one of the gears 30c, 30d and the output shaft 22 rotate integrally, and a disconnected state in which the third-speed gear 30c and the sixth-speed gear 30d are disconnected from the output shaft 22 and the gears 30c, 30d and the output shaft 22 rotate relatively to each other. The third switching mechanism 28c is a connecting-disconnecting mechanism configured to be able to switch between a connected state in which the fourth-speed gear 30e or the first-speed gear 30f is connected to the output shaft 22 and one of the gears 30e, 30f and the output shaft 22 rotate integrally, and a disconnected state in which the fourth-speed gear 30e and the first-speed gear 30f are disconnected from the output shaft 22 and the gears 30e, 30f and the output shaft 22 rotate relatively to each other (hereinafter, when the first switching mechanism 28a to the third switching mechanism 28c are not distinguished from one another, these switching mechanisms will be referred to as switching mechanisms 28). The first switching mechanism 28a to the third switching mechanism 28c are examples of the switching mechanisms of the disclosure.

The input gear pair 26a includes the input gear 30a and a counter gear 32a meshing with the input gear 30a. The input gear 30a is connected to the input shaft 18, and power from the engine 12 is transmitted to the input gear 30a through the clutch 16. The counter gear 32a is provided on the counter shaft 20 that rotates around a rotational axis CL2, so as to be unable to rotate relatively to the counter shaft 20. Therefore, when the input gear 30a rotates, the rotation is transmitted to the counter gear 32a, causing the counter shaft 20 to rotate. When the input gear 30a is connected to the output shaft 22 by the first switching mechanism 28a, the input shaft 18 and the output shaft 22 are directly coupled to each other. Thus, a fifth gear stage 5th with a gear ratio $\gamma$ of 1.0 is established in the transmission 10. On a surface of the input gear 30a that faces the first switching mechanism 28a, gear-side meshing teeth 70a capable of meshing with meshing teeth 66a, 76a (to be described later) of the first switching mechanism 28a are formed. The input gear 30a is one example of the speed-changing gear of the disclosure.

The second-speed gear pair 26b includes the second-speed gear 30b and a second-speed counter gear 32b meshing with the second-speed gear 30b. The second-speed gear 30b is fitted on an outer circumferential side of the output shaft 22 so as to be able to rotate relatively to the output shaft 22. The second-speed counter gear 32b is provided on the counter shaft 20 so as to be unable to rotate relatively to the counter shaft 20. When the second-speed gear 30b is connected to the output shaft 22 by the first switching mechanism 28a so as to be able to transmit power, the input shaft 18 and the output shaft 22 are connected to each other through the second-speed gear pair 26b so as to be able to transmit power. Thus, a second gear stage 2nd is established in the transmission 10. On a surface of the second-speed gear 30b that faces the first switching mechanism 28a, gear-side meshing teeth 70b capable of meshing with meshing teeth 68a, 72a (to be described later) of the first switching mechanism 28a are formed. The second-speed gear 30b is one example of the speed-changing gear of the disclosure.

The third-speed gear pair 26c includes the third-speed gear 30c and a third-speed counter gear 32c meshing with the third-speed gear 30c. The third-speed gear 30c is fitted on an outer circumferential surface of the output shaft 22 so as to be able to rotate relatively to the output shaft 22. The third-speed counter gear 32c is provided on the counter shaft 20 so as to be unable to rotate relatively to the counter shaft 20. When the third-speed gear 30c is connected to the output shaft 22 by the second switching mechanism 28b so as to be able to transmit power, the input shaft 18 and the output shaft 22 are connected to each other through the third-speed gear pair 26c so as to be able to transmit power. Thus, a third gear stage 3rd is established in the transmission 10. On a surface of the third-speed gear 30c that faces the second switching mechanism 28b, gear-side meshing teeth 70c capable of meshing with meshing teeth 66b, 76b (to be described later) of the second switching mechanism 28b are formed. The third-speed gear 30c is one example of the speed-changing gear of the disclosure.

The sixth-speed gear pair 26d includes the sixth-speed gear 30d and a sixth-speed counter gear 32d meshing with the sixth-speed gear 30d. The sixth-speed gear 30d is fitted on the outer circumferential surface of the output shaft 22 so as to be able to rotate relatively to the output shaft 22. The sixth-speed counter gear 32d is provided on the counter shaft 20 so as to be unable to rotate relatively to the counter shaft 20. When the sixth-speed gear 30d is connected to the output shaft 22 by the second switching mechanism 28b so as to be able to transmit power, the input shaft 18 and the output shaft 22 are connected to each other through the sixth-speed gear pair 26d so as to be able to transmit power. Thus, a sixth gear stage 6th in which the gear ratio $\gamma$ is lowest is established in the transmission 10. On a surface of the sixth-speed gear 30d that faces the second switching mechanism 28b, gear-side meshing teeth 70d capable of meshing with meshing teeth 68b, 72b (to be described later) of the second switching mechanism 28b are formed. The sixth-speed gear 30d is one example of the speed-changing gear of the disclosure.

The fourth-speed gear pair 26e includes the fourth-speed gear 30e and a fourth-speed counter gear 32e meshing with the fourth-speed gear 30e. The fourth-speed gear 30e is fitted on the outer circumferential surface of the output shaft 22 so as to be able to rotate relatively to the output shaft 22. The fourth-speed counter gear 32e is provided on the counter shaft 20 so as to be unable to rotate relatively to the counter shaft 20. When the fourth-speed gear 30e is connected to the output shaft 22 by the third switching mechanism 28c so as to be able to transmit power, the input shaft 18 and the output shaft 22 are connected to each other through the fourth-speed gear pair 26e so as to be able to transmit power. Thus, a fourth gear stage 4th is established in the transmission 10. On a surface of the fourth-speed gear 30e that faces the third switching mechanism 28c, gear-side meshing teeth 70e capable of meshing with meshing teeth 66c, 76c (to be described later) of the third switching mechanism 28c are formed. The fourth-speed gear 30e is one example of the speed-changing gear of the disclosure.

The first-speed gear pair 26f includes the first-speed gear 30f and a first-speed counter gear 32f meshing with the first-speed gear 30f. The first-speed gear 30f is fitted on the outer circumferential surface of the output shaft 22 so as to be able to rotate relatively to the output shaft 22. The first-speed counter gear 32f is provided on the counter shaft 20 so as to be unable to rotate relatively to the counter shaft 20. When the first-speed gear 30f is connected to the output shaft 22 by the third switching mechanism 28c so as to be able to transmit power, the input shaft 18 and the output shaft 22 are connected to each other through the first-speed gear pair 26f so as to be able to transmit power. Thus, a first gear stage 1st in which the gear ratio $\gamma$ is highest is established in the transmission 10. On a surface of the first-speed gear 30f that faces the third switching mechanism 28c, gear-side meshing teeth 70f capable of meshing with meshing teeth 68c, 72c (to be described later) of the third switching mechanism 28c are formed. The first-speed gear 30f is one example of the speed-changing gear of the disclosure. Hereinafter, when the input gear 30a to the first-speed gear 30f are not particularly distinguished from one another, these gears will be referred to as gears 30, and when the gear-side meshing teeth 70a to 70f are not particularly distinguished from one another, these gear-side meshing teeth will be referred to as gear-side meshing teeth 70.

Thus, the transmission 10 is configured to be able to switch to six forward gear stages as the operating states of the first switching mechanism 28a to the third switching mechanism 28c are switched. The operating state of each switching mechanism 28 is switched as the switching mechanism 28 is moved in the axial direction of the output shaft 22. The switching mechanisms 28 are moved in the axial direction of the output shaft 22 by a shifting mechanism 33.

Figure 2:
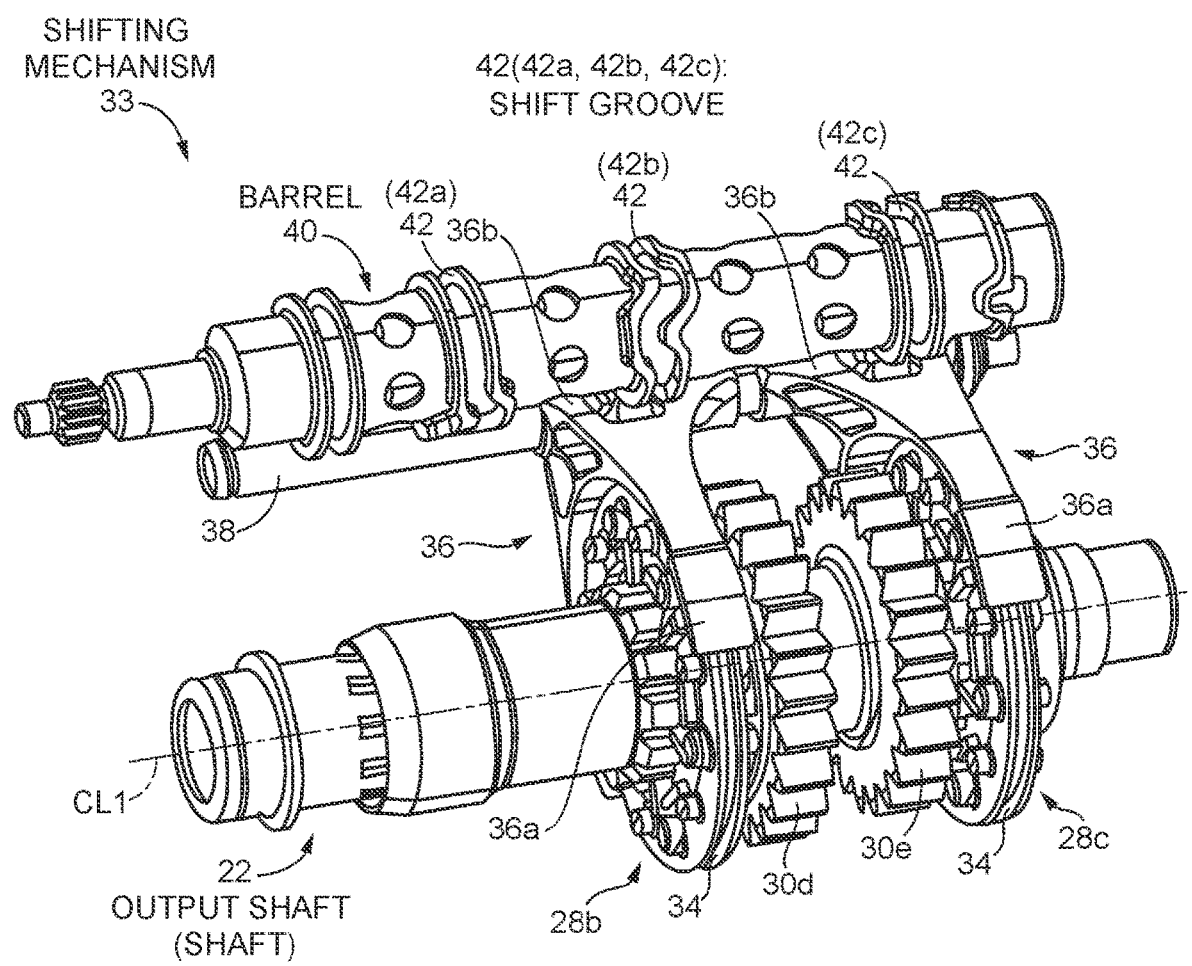
FIG. 2 is a perspective view of a shifting mechanism that applies an operating force for moving switching mechanisms of FIG. 1.

FIG. 2 is a perspective view of the shifting mechanism 33 that applies an operating force for moving the switching mechanisms 28 in the axial direction of the output shaft 22. In the perspective view of FIG. 2, the second switching mechanism 28b and the third switching mechanism 28c are shown while the first switching mechanism 28a is omitted.

Further, the input gear 30*a* and the second-speed gear 30*b*, the third-speed gear 30*c*, and the first-speed gear 30*f* are omitted. The input gear 30*a* and the second-speed gear 30*b* are connected to and disconnected from the output shaft 22 by the first switching mechanism 28*a*, the third-speed gear 30*c* is connected to and disconnected from the output shaft 22 by the second switching mechanism 28*b*, and the first-speed gear 30*f* is connected to and disconnected from the output shaft 22 by the third switching mechanism 28*c*.

The shifting mechanism 33 includes: shifting forks 36 that are respectively fitted to the switching mechanisms 28; a retaining shaft 38 that retains the shifting forks 36; a barrel 40 having shift grooves 42 (to be described later) that define the positions of the shifting forks 36 fitted to the switching mechanisms 28; and a shifting actuator 41 (see FIG. 1 and FIG. 8) that rotates the barrel 40. The retaining shaft 38 and the barrel 40 are disposed parallel to the rotational axis CL1 of the output shaft 22.

Each shifting fork 36 includes a fitting part 36*a* that has a two-pronged shape and is fitted in an annular recessed groove 34 formed on an outer circumferential side of the switching mechanism 28, and a retained part 36*b* that is retained by the retaining shaft 38. The retaining shaft 38 is passed through the retained part 36*b* in the direction of the rotational axis CL1. The shifting forks 36 are allowed to move relatively to the retaining shaft 38 in the direction of the rotational axis CL1.

The retained part 36*b* of each shifting fork 36 has a protrusion 46 (see FIG. 4), and the protrusion 46 is engaged with the shift groove 42 formed in the barrel 40. There are the same number of shift grooves 42 as the number of the shifting forks 36 (in this embodiment, three). Each shift groove 42 is formed along a circumferential direction of the barrel 40, and is shaped such that a portion thereof in the circumferential direction is bent in an axial direction of the barrel 40. Therefore, when the protrusion 46 of each shifting fork 36 comes into contact with the bent portion of the shift groove 42 as the barrel 40 rotates, the protrusion 46 is moved in the axial direction of the output shaft 22 (the direction of the rotational axis CL1) according to the shape of the shift groove 42. As a result, the shifting fork 36 is moved in the direction of the rotational axis CL1 according to the shape of the shift groove 42. Moreover, when the shifting fork 36 is moved in the direction of the rotational axis CL1, the switching mechanism 28 fitted to the shifting fork 36 is also moved in the direction of the rotational axis CL1. In this way, the switching mechanism 28 fitted to the shifting fork 36 is moved in the axial direction of the output shaft 22 as a force that moves the switching mechanism 28 in the axial direction of the output shaft 22, i.e., an operating force for switching the operating state of the switching mechanism 28, is applied to the switching mechanism 28 through the shifting fork 36.

Each shift groove 42 has a different shape relative to the position in the circumferential direction of the barrel 40. Specifically, the shift grooves 42 are formed such that as the barrel 40 rotates in one direction, the transmission 10 is upshifted sequentially in order of the first gear stage 1st to the sixth gear stage 6th, and that as the barrel 40 rotates in the other direction, the transmission 10 is downshifted sequentially in order of the sixth gear stage 6th to the first gear stage 1st. Moreover, the shift grooves 42 are shaped such that the operating states of the switching mechanisms 28 are switched at an appropriate timing during a transition period of an upshift or a downshift. Therefore, as the barrel 40 rotates, each switching mechanism 28 is moved in the axial direction of the output shaft 22, and the transmission 10 is shifted according to the positions of the switching mechanisms 28. Hereinafter, the shift groove 42 with which the protrusion 46 formed in the shifting fork 36 fitted to the first switching mechanism 28*a* is engaged will be referred to as a shift groove 42*a*. The shift groove 42 with which the protrusion 46 formed in the shifting fork 36 fitted to the second switching mechanism 28*b* is engaged will be referred to as a shift groove 42*b*. The shift groove 42 with which the protrusion 46 formed in the shifting fork 36 fitted to the third switching mechanism 28*c* is engaged will be referred to as a shift groove 42*c*. The operations of the switching mechanisms 28 during a transition period of a gear change will be described later.

Figure 3:
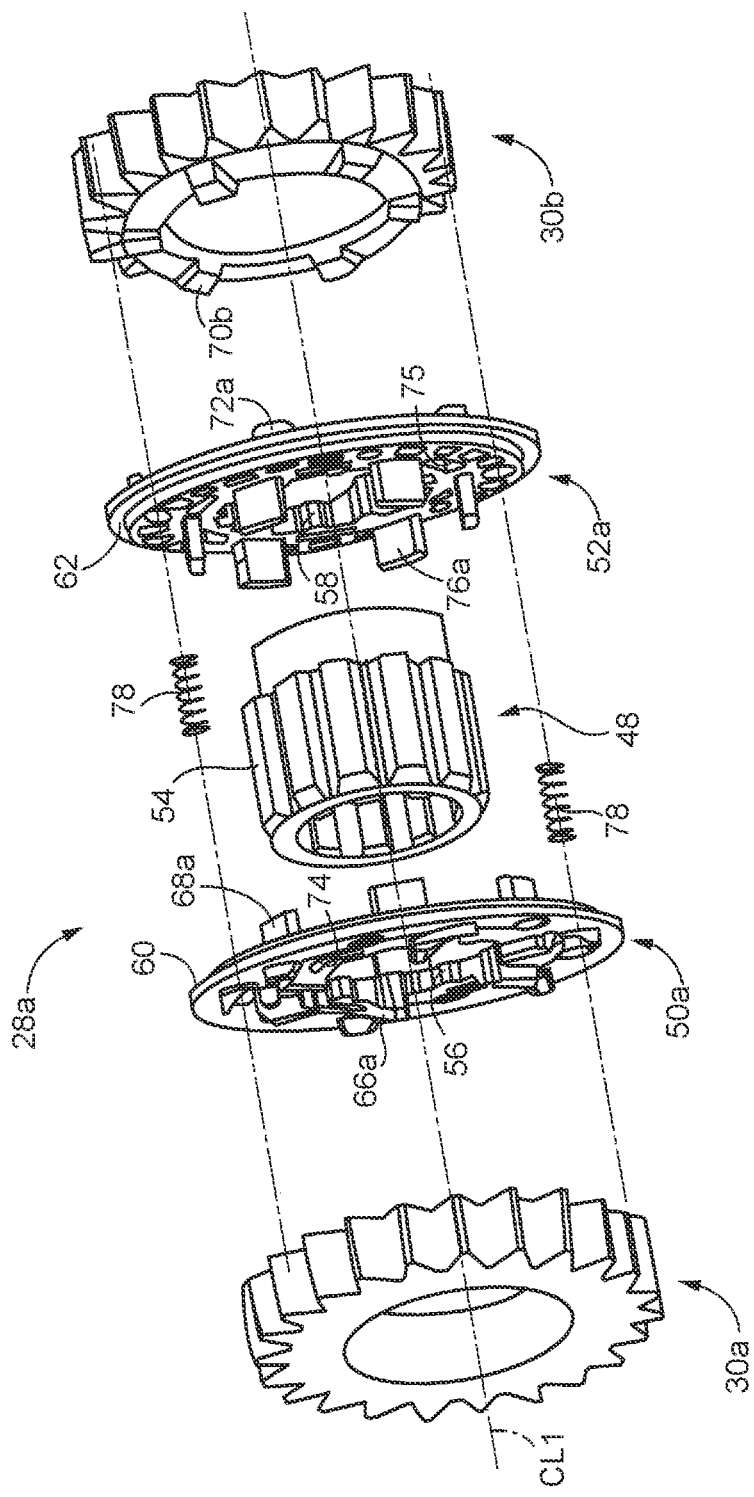
FIG. 3 is an exploded perspective view showing a second switching mechanism of FIG. 2.

Next, the structure of the switching mechanism 28 will be described. FIG. 3 is an exploded perspective view of the first switching mechanism 28*a* of FIG. 2. While the structure of the first switching mechanism 28*a* will be described below, the structures of the second switching mechanism 28*b* and the third switching mechanism 28*c* are basically the same as the structure of the first switching mechanism 28*a* and therefore the description thereof will be omitted.

The first switching mechanism 28*a* includes a sleeve 48, a disc-shaped first dog ring 50*a*, a disc-shaped second dog ring 52*a*, and springs 78 interposed between the first dog ring 50*a* and the second dog ring 52*a*. When the input gear 30*a* is the speed-changing gear of the disclosure, the first dog ring 50*a* is one example of the first ring of the disclosure and the second dog ring 52*a* is one example of the second ring of the disclosure. On the other hand, when the second-speed gear 30*b* is the speed-changing gear of the disclosure, the second dog ring 52*a* is one example of the first ring of the disclosure and the first dog ring 50*a* is one example of the second ring of the disclosure.

The sleeve 48 has a cylindrical shape, and spline teeth that are spline-fitted on the output shaft 22 are formed on an inner circumference of the sleeve 48. Therefore, when the sleeve 48 is spline-fitted on the output shaft 22 after assembly, the sleeve 48 rotates integrally with the output shaft 22. On an outer circumferential surface of the sleeve 48, spline teeth 54 that are spline-fitted to the first dog ring 50*a* and the second dog ring 52*a* are formed.

The first dog ring 50*a* is disposed at a position adjacent to the input gear 30*a* in the axial direction of the output shaft 22 (the direction of the rotational axis CL1). The first dog ring 50*a* is disposed at a position separated from the second-speed gear 30*b* by the second dog ring 52*a* in the direction of the rotational axis CL1. The first dog ring 50*a* has a disc shape and can rotate around the rotational axis CL1. Spline teeth 56 that are spline-fitted to the spline teeth 54 of the sleeve 48 are formed on an inner circumference of the first dog ring 50*a*.

The second dog ring 52*a* is disposed at a position adjacent to the second-speed gear 30*b* in the direction of the rotational axis CL1. The second dog ring 52*a* is disposed at a position separated from the input gear 30*a* by the first dog ring 50*a* in the direction of the rotational axis CL1. The second dog ring 52*a* has a disc shape and can rotate around the rotational axis CL1. Spline teeth 58 that are spline-fitted to the spline teeth 54 of the sleeve 48 are formed on an inner circumference of the second dog ring 52*a*. Therefore, when the first dog ring 50*a* and the second dog ring 52*a* are spline-fitted on the sleeve 48, the first dog ring 50*a* and the second dog ring 52*a* are unable to rotate relatively to the output shaft 22 and able to move relatively to the output shaft 22 in the axial direction of the output shaft 22.

On a side of the first dog ring 50*a* that faces the second dog ring 52*a* in the direction of the rotational axis CL1, a notch 60 is formed along an entire circumference by cutting an outer circumferential end of the first dog ring 50a into an L-shape. Similarly, on a side of the second dog ring 52a that faces the first dog ring 50a in the direction of the rotational axis CL1, a notch 62 is formed along an entire circumference by cutting an outer circumferential end of the second dog ring 52a into an L-shape. When the first dog ring 50a and the second dog ring 52a are integrally assembled, the recessed groove 34 that is fitted to the fitting part 36a of the shifting fork 36 is formed by the L-shaped notches 60, 62 of these dog rings.

A plurality of (in this embodiment, six) first meshing teeth 66a protruding toward the input gear 30a is formed on a surface of the first dog ring 50a that faces the input gear 30a in the direction of the rotational axis CL1, at equal angular intervals in the circumferential direction. The first meshing teeth 66a are formed at such positions that when the first dog ring 50a moves toward the input gear 30a in the direction of the rotational axis CL1, the first meshing teeth 66a can mesh with the gear-side meshing teeth 70a (not shown in FIG. 3) formed in the input gear 30a.

A plurality of (in this embodiment, six) second meshing teeth 68a protruding toward the second dog ring 52a is formed on a surface of the first dog ring 50a that faces the second dog ring 52a in the direction of the rotational axis CL1, at equal angular intervals in the circumferential direction. In an assembled state of the first dog ring 50a and the second dog ring 52a, the second meshing teeth 68a protrude from the first dog ring 50a toward the second-speed gear 30b by passing through through-holes 75 (to be described later) of the second dog ring 52a. The second meshing teeth 68a are formed at such positions that when the first dog ring 50a moves toward the second-speed gear 30b in the direction of the rotational axis CL1, the second meshing teeth 68a can mesh with the gear-side meshing teeth 70b of the second-speed gear 30b.

The first dog ring 50a has a plurality of (in this embodiment, six) through-holes 74 that extends through the first dog ring 50a and is formed at equal angular intervals in the circumferential direction. The through-holes 74 are formed at such positions that fourth meshing teeth 76a (to be described later) of the second dog ring 52a are passed through the through-holes 74 in an assembled state of the first dog ring 50a and the second dog ring 52a.

On a surface of the second dog ring 52a that faces the second-speed gear 30b in the direction of the rotational axis CL1, a plurality of (in this embodiment, six) third meshing teeth 72a protruding toward the second-speed gear 30b is formed at equal angular intervals in the circumferential direction. The third meshing teeth 72a are formed at such positions that when the second dog ring 52a moves toward the second-speed gear 30b in the direction of the rotational axis CL1, the third meshing teeth 72a can mesh with the gear-side meshing teeth 70b formed in the second-speed gear 30b. The third meshing teeth 72a are examples of the first meshing teeth of the disclosure.

On a surface of the second dog ring 52a that faces the first dog ring 50a in the direction of the rotational axis CL1, a plurality of (in this embodiment, six) fourth meshing teeth 76a passing through the first dog ring 50a is formed at equal angular intervals in the circumferential direction. In an assembled state of the first dog ring 50a and the second dog ring 52a, the fourth meshing teeth 76a protrude from the first dog ring 50a toward the input gear 30a by passing through the through-holes 74 of the first dog ring 50a. The fourth meshing teeth 76a are formed at such positions that when the second dog ring 52a moves toward the input gear 30a in the direction of the rotational axis CL1, the fourth meshing teeth 76a can mesh with the gear-side meshing teeth 70a of the input gear 30a. The fourth meshing teeth 76c are examples of the second meshing teeth of the disclosure.

The second dog ring 52a has a plurality of (in this embodiment, six) through-holes 75 that extends through the second dog ring 52a and is formed at equal angular intervals in the circumferential direction. The through-holes 75 are formed at such positions that the second meshing teeth 68a of the first dog ring 50a pass through the through-holes 75 in an assembled state of the first dog ring 50a and the second dog ring 52a.

The first dog ring 50a and the second dog ring 52a are coupled together by a plurality of springs 78 interposed between the first dog ring 50a and the second dog ring 52a. The first dog ring 50a and the second dog ring 52a are urged by the springs 78 in a direction in which these dog rings are drawn toward each other. Therefore, surfaces of the first dog ring 50a and the second dog ring 52a that face each other are in contact with each other when no external force is applied to the first switching mechanism 28a. The structure for coupling the first dog ring 50a and the second dog ring 52a using the springs 78 is a commonly known technique, and therefore the description thereof will be omitted.

Figure 4:
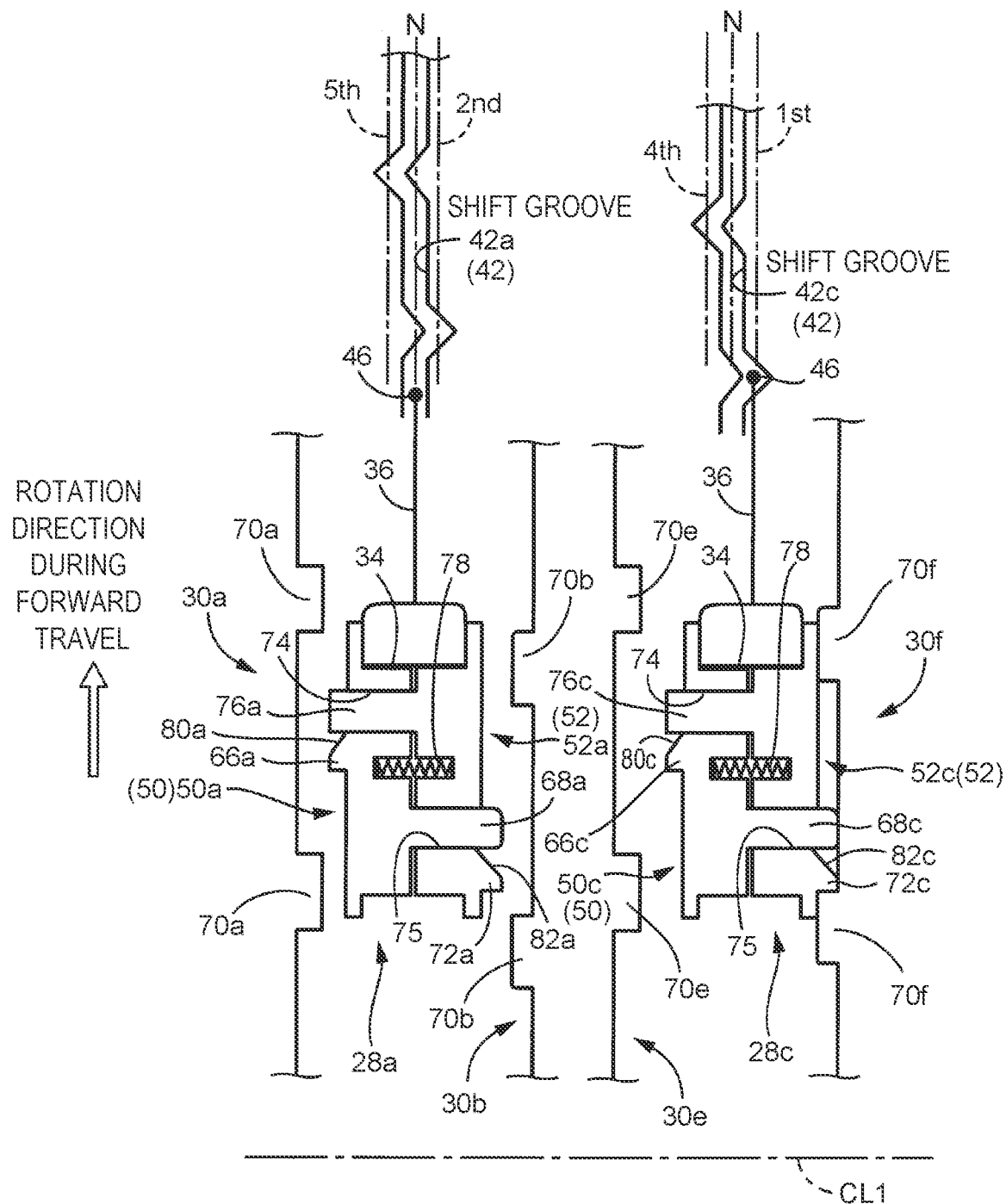
FIG. 4 is a view schematically showing operating states of a first switching mechanism and a third switching mechanism during travel in a first gear stage.

FIG. 4 is a view schematically showing operating states of the first switching mechanism 28a and the third switching mechanism 28c during travel in the first gear stage 1st. The left side of FIG. 4 corresponds to the first switching mechanism 28a, and a part of the first switching mechanism 28a in the circumferential direction is shown in a simplified manner as developed into a plan view. The right side of FIG. 4 corresponds to the third switching mechanism 28c, and a part of the third switching mechanism 28c in the circumferential direction is shown in a simplified manner as developed into a plan view. On both sides of the first switching mechanism 28a in the direction of the rotational axis CL1, the gear-side meshing teeth 70a of the input gear 30a and the gear-side meshing teeth 70b of the second-speed gear 30b are respectively shown as developed into a plan view. On both sides of the third switching mechanism 28c in the direction of the rotational axis CL1, the gear-side meshing teeth 70e of the fourth-speed gear 30e and the gear-side meshing teeth 70f of the first-speed gear 30f are respectively shown as developed into a plan view. In FIG. 4, the second switching mechanism 28b is omitted.

In the first switching mechanism 28a of FIG. 4, the members located on the left side and the right side of the first switching mechanism 28a in the sheet of the drawing correspond to the first dog ring 50a and the second dog ring 52a, respectively.

The first switching mechanism 28a of FIG. 4 will be described. The first dog ring 50a and the second dog ring 52a are in contact with each other under the urging force of the springs 78. The first dog ring 50a has the first meshing teeth 66a protruding toward the input gear 30a, and the second meshing teeth 68a protruding toward the second-speed gear 30b by passing through the through-holes 75 of the second dog ring 52a. The second dog ring 52a has the third meshing teeth 72a protruding toward the second-speed gear 30b, and the fourth meshing teeth 76a protruding toward the input gear 30a by passing through the through-holes 74 of the first dog ring 50a.

The shifting fork 36 is fitted in the recessed groove 34 formed by the first dog ring 50a and the second dog ring 52a. The shifting fork 36 has the protrusion 46 represented by the black point in FIG. 4, and the protrusion 46 is engaged with the shift groove 42a formed in the barrel 40. Therefore, when the shape of the shift groove 42a engaging with the protrusion 46 changes as the barrel 40 rotates, the shifting fork 36 moves in the direction of the rotational axis CL1 according to the shape of the shift groove 42a.

The structure of the third switching mechanism 28c shown in FIG. 4 is basically the same as the above-described structure of the first switching mechanism 28a, and therefore a detailed description thereof will be omitted. In the following description, to distinguish the third switching mechanism 28c from the first switching mechanism 28a, those components of the third switching mechanism 28c that correspond to the first dog ring 50a, second dog ring 52a, first meshing teeth 66a, second meshing teeth 68a, third meshing teeth 72a, and fourth meshing teeth 76a of the first switching mechanism 28a will be referred to as a first dog ring 50c, second dog ring 52c, first meshing teeth 66c, second meshing teeth 68c, third meshing teeth 72c, and fourth meshing teeth 76c. The first dog ring 50c is one example of the first ring of the disclosure, and the second dog ring 52c is one example of the second ring of the disclosure. The third meshing teeth 72c are examples of the first meshing teeth of the disclosure, and the fourth meshing teeth 76c are examples of the second meshing teeth of the disclosure.

An upward direction in the sheet of FIG. 4 indicated by the arrow is a rotation direction during forward travel. During forward travel, the input gear 30a, the second-speed gear 30b, the fourth-speed gear 30e, and the first-speed gear 30f move toward the upper side in the sheet of FIG. 4. The input gear 30a, the second-speed gear 30b, the fourth-speed gear 30e, and the first-speed gear 30f are rotated at rotation speeds based on the rotation speed of the engine 12 and the gear ratio γ mechanically set for each gear stage. Specifically, the rotation speed of the first-speed gear 30f corresponding to the first gear stage 1st is lowest, and the rotation speed of a speed-changing gear corresponding to a higher gear stage is higher. The first switching mechanism 28a and the third switching mechanism 28c also rotate during forward travel, and therefore move toward the upper side in the sheet of FIG. 4. Since the first switching mechanism 28a and the third switching mechanism 28c rotate integrally with the output shaft 22, the rotation speeds of these switching mechanisms are equal. The first meshing teeth 66a, 66c have inclined surfaces 80a, 80c, respectively, and the third meshing teeth 72a, 72c have inclined surfaces 82a, 82c, respectively.

Operating states of the first switching mechanism 28a and the third switching mechanism 28c during travel in the first gear stage 1st shown in FIG. 4 will be described. During travel in the first gear stage 1st, the shifting fork 36 fitted in the recessed groove 34 of the first switching mechanism 28a has been moved to a neutral position based on the shift groove 42a. Here, the meshing teeth of the first switching mechanism 28a mesh with neither the gear-side meshing teeth 70a of the input gear 30a nor the gear-side meshing teeth 70b of the second-speed gear 30b, and thus power transmission between the first switching mechanism 28a and these gears 30a, 30b is interrupted. Therefore, the input gear 30a, the second-speed gear 30b, and the output shaft 22 rotate relatively to one another, and power transmission between these gears 30a, 30b and the output shaft 22 is interrupted.

On the other hand, the shifting fork 36 fitted in the recessed groove 34 of the third switching mechanism 28c has been moved to the position of the first gear stage (1st position) based on the shape of the shift groove 42c. Here, the third switching mechanism 28c is moved toward the first-speed gear 30f. Thus, as shown in FIG. 4, the third meshing teeth 72c and the gear-side meshing teeth 70f of the first-speed gear 30f mesh with each other and power transmission between the third switching mechanism 28c and the first-speed gear 30f is allowed. Thus, the first gear stage 1st is established as the first-speed gear 30f and the output shaft 22 are connected to each other through the third switching mechanism 28c so as to be able to transmit power. In the first gear stage 1st, the second switching mechanism 28b (not shown) is moved to a neutral position in which power transmission between the third-speed gear 30c and the sixth-speed gear 30d is interrupted, and power transmission to the output shaft 22 is interrupted as in the first switching mechanism 28a.

Figure 5:
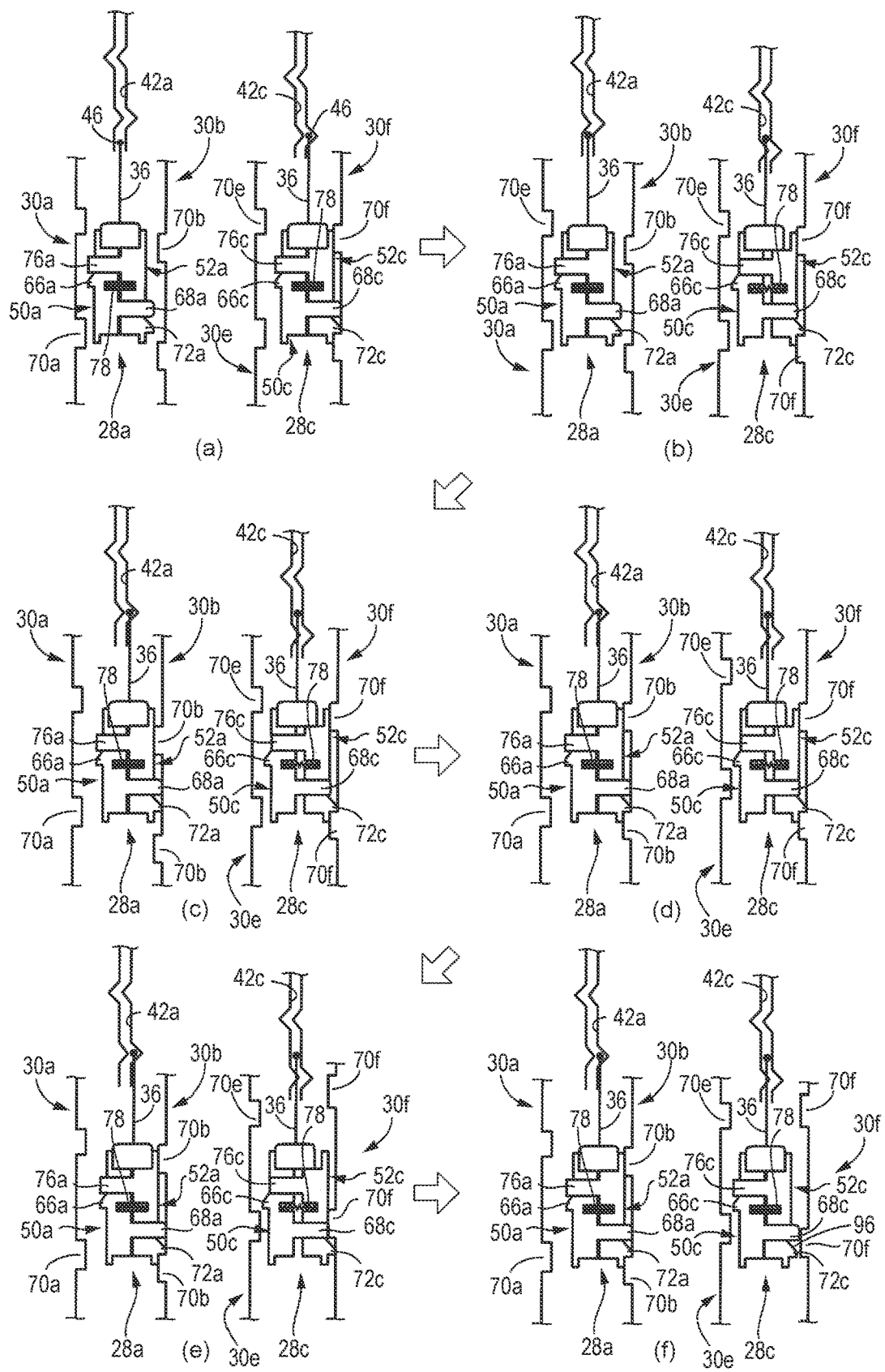
FIG. 5 is a view showing, in chronological order, operating states of the first switching mechanism and the third switching mechanism during a transition period of an upshift from the first gear stage to a second gear stage.

FIG. 5 shows, in chronological order, operating states of the first switching mechanism 28a and the third switching mechanism 28c during a transition period of an upshift of the transmission 10 from the first gear stage 1st to the second gear stage 2nd during travel on power from the engine 12. During a transition period of an upshift, the first switching mechanism 28a and the third switching mechanism 28c operate in the order of (a) to (f) shown in FIG. 5. The second switching mechanism 28b (not shown) is held in the neutral position during a transition period of a gear change from the first gear stage 1st to the second gear stage 2nd.

A part (a) in FIG. 5 shows a state during travel in the first gear stage 1st (i.e., before an upshift is started). As this state is exactly the same as the above-described state shown in FIG. 4, the description thereof will be omitted.

A part (b) in FIG. 5 shows an operating state when an upshift to the second gear stage 2nd is started. As the barrel 40 rotates, the shifting fork 36 is moved in a direction away from the first-speed gear 30f (a leftward direction in the sheet of the drawing) according to the change in shape of the shift groove 42c. Then, the first dog ring 50c is pressed by the shifting fork 36 so as to move in a direction away from the second dog ring 52c, and the springs 78 interposed between the first dog ring 50c and the second dog ring 52c are elastically deformed. On the other hand, since power is transmitted between the third meshing teeth 72c of the second dog ring 52c and the gear-side meshing teeth 70f of the first-speed gear 30f, friction resistance between the third meshing teeth 72c and the gear-side meshing teeth 70f keeps the third meshing teeth 72c and the gear-side meshing teeth 70f in mesh against the elastic restoring force of the springs 78. Thus, the first dog ring 50c and the second dog ring 52c of the third switching mechanism 28c are separated from each other.

A part (c) in FIG. 5 shows a state in which the first switching mechanism 28a has moved toward the second-speed gear 30b to form the second gear stage 2nd. As the barrel 40 rotates, the position of the shifting fork 36 engaging with the shift groove 42a changes, and the first switching mechanism 28a is pressed by the shifting fork 36 so as to move toward the second-speed gear 30b. Thus, the third meshing teeth 72a of the first dog ring 50a and the gear-side meshing teeth 70b of the second-speed gear 30b become able to mesh with each other (a part (c) in FIG. 5 shows a state before meshing).

A part (d) in FIG. 5 shows a state in which the third meshing teeth 72a of the first dog ring 50a and the gear-side meshing teeth 70b of the second-speed gear 30b have meshed with each other in the first switching mechanism 28a (i.e., the connected state of the first switching mechanism 28a). Since the rotation speed of the second-speed gear 30b is higher than the rotation speed of the first switching mechanism 28a, the third meshing teeth 72a and the gear-side meshing teeth 70*b* of the second-speed gear 30*b* mesh with each other as soon as the state shown in a part (c) in FIG. 5 is created. Here, a simultaneous meshing state arises in which the third meshing teeth 72*a* of the first switching mechanism 28*a* and the gear-side meshing teeth 70*b* of the second-speed gear 30*b* mesh with each other and, at the same time, the third meshing teeth 72*c* of the third switching mechanism 28*c* and the gear-side meshing teeth 70*f* of the first-speed gear 30*f* mesh with each other. This simultaneous meshing state shown in a part (d) in FIG. 5 exists only for an extremely short time.

A part (e) in FIG. 5 shows a state in which the third meshing teeth 72*c* of the first dog ring 50*c* and the gear-side meshing teeth 70*f* of the first-speed gear 30*f* have come out of mesh in the third switching mechanism 28*c* (i.e., the disconnected state of the third switching mechanism 28*c*). When the gear-side meshing teeth 70*b* of the second-speed gear 30*b* and the third meshing teeth 72*a* of the first switching mechanism 28*a* mesh with each other in a part (d) in FIG. 5, the output shaft 22 is rotated at a rotation speed corresponding to the second gear stage 2nd, so that the rotation speed of the third switching mechanism 28*c* becomes higher than the rotation speed of the first-speed gear 30*f*. As a result, the third meshing teeth 72*c* of the second dog ring 52*c* and the gear-side meshing teeth 70*f* of the first-speed gear 30*f* come out of mesh.

A part (f) in FIG. 5 shows a state in which the second dog ring 52*c* has been drawn toward the first dog ring 50*c* in the third switching mechanism 28*c*. When the third meshing teeth 72*c* and the gear-side meshing teeth 70*f* of the first-speed gear 30*f* come out of mesh in a part (e) in FIG. 5, friction resistance that has been acting between the third meshing teeth 72*c* and the gear-side meshing teeth 70*f* disappears, so that the second dog ring 52*c* is drawn toward the first dog ring 50*c* by the elastic restoring force of the springs 78. As a result, the third switching mechanism 28*c* is moved to a neutral position in which the third switching mechanism 28*c* does not mesh with any of the gear-side meshing teeth 70. This completes a gear change of the transmission 10 to the second gear stage 2nd. Thus, as soon as the third meshing teeth 72*a* of the first switching mechanism 28*a* and the gear-side meshing teeth 70*b* of the second-speed gear 30*b* mesh with each other, the third meshing teeth 72*c* of the third switching mechanism 28*c* and the gear-side meshing teeth 70*f* of the first-speed gear 30*f* come out of mesh, so that torque interruption during a gear change is prevented. While FIG. 5 shows an upshift from the first gear stage 1st to the second gear stage 2nd as an example, other upshifts (e.g., an upshift from the second gear stage 2nd to the third gear stage 3rd) are performed by the same procedure.

Figure 6:
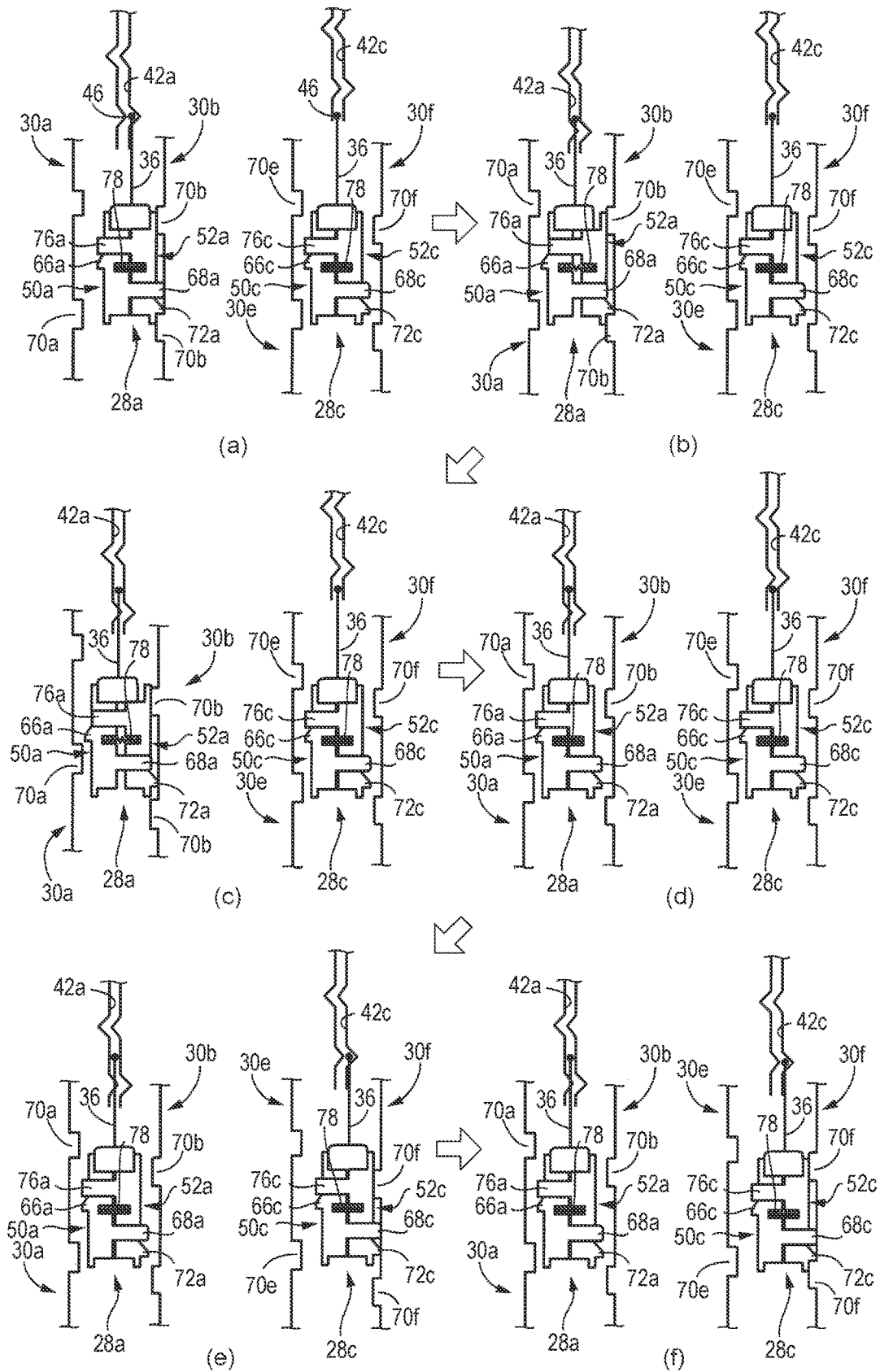
FIG. 6 is a view showing, in chronological order, operating states of the first switching mechanism and the third switching mechanism during a transition period of a downshift from the second gear stage to the first gear stage.

Next, a downshift of the transmission 10 from the second gear stage 2nd to the first gear stage 1st during travel on power from the engine 12 will be described. FIG. 6 shows, in chronological order, operating states of the first switching mechanism 28*a* and the third switching mechanism 28*c* during a transition period of a downshift from the second gear stage 2nd to the first gear stage 1st.

A part (a) in FIG. 6 shows a state during travel in the second gear stage 2nd (i.e., before a downshift is started). During travel in the second gear stage 2nd, the first switching mechanism 28*a* has been moved to the position of the second gear stage (2nd position) in which the second gear stage 2nd is established, while the third switching mechanism 28*c* has been moved to a neutral position in which power transmission is interrupted. Here, as the third meshing teeth 72*a* of the second dog ring 52*a* and the gear-side meshing teeth 70*b* of the second-speed gear 30*b* mesh with each other, the second gear stage 2nd is established in which power transmitted from the second-speed gear 30*b* is transmitted to the output shaft 22 through the first switching mechanism 28*a*.

A part (b) in FIG. 6 shows an operating state when a downshift to the first gear stage 1st is started. As the barrel 40 rotates in the downshift direction, the shifting fork 36 fitted in the shift groove 42*a* is moved in the direction away from the second-speed gear 30*b* in the direction of the rotational axis CL1. Then, the first dog ring 50*a* of the first switching mechanism 28*a* is moved by the shifting fork 36 in the direction away from the second-speed gear 30*b*. As for the second dog ring 52*a* of the first switching mechanism 28*a*, friction resistance between the third meshing teeth 72*a* and the gear-side meshing teeth 70*b* of the second-speed gear 30*b* keeps the third meshing teeth 72*a* and the gear-side meshing teeth 70*b* of the second-speed gear 30*b* in mesh against the urging force of the springs 78. Therefore, the second dog ring 52*a* is not moved in the direction away from the second-speed gear 30*b*, and the first dog ring 50*a* and the second dog ring 52*a* are separated from each other.

A part (c) in FIG. 6 shows a state in which the torque of the engine 12 has been reduced and, as a result, the third meshing teeth 72*a* of the second dog ring 52*a* and the gear-side meshing teeth 70*b* of the second-speed gear 30*b* have come out of mesh (i.e., the disconnected state of the first switching mechanism 28*a*). When the torque of the engine 12 is reduced, the rotation speed of the second-speed gear 30*b* decreases, so that the third meshing teeth 72*a* and the gear-side meshing teeth 70*b* of the second-speed gear 30*b* come out of mesh.

A part (d) in FIG. 6 shows a state in which the second dog ring 52*a* has been moved in the direction away from the second-speed gear 30*b* as a result of the third meshing teeth 72*a* of the second dog ring 52*a* and the gear-side meshing teeth 70*b* of the second-speed gear 30*b* coming out of mesh. When the third meshing teeth 72*a* and the gear-side meshing teeth 70*b* come out of mesh, the second dog ring 52*a* is moved in the direction away from the second-speed gear 30*b* by the elastic restoring force of the springs 78. Then, the meshing teeth of the first switching mechanism 28*a* mesh with neither the gear-side meshing teeth 70*a* of the input gear 30*a* nor the gear-side meshing teeth 70*b* of the second-speed gear 30*b*, and thus, power transmission in the first switching mechanism 28*a* is interrupted.

A part (e) in FIG. 6 shows a state in which the barrel 40 has rotated further in the downshift direction and, as a result, the third switching mechanism 28*c* has been moved toward the first-speed gear 30*f* in the direction of the rotational axis CL1. When the barrel 40 rotates in the downshift direction, the shifting fork 36 fitted in the shift groove 42*c* is moved toward the first-speed gear 30*f* in the direction of the rotational axis CL1, and the third switching mechanism 28*c* fitted to the shifting fork 36 is also moved toward the first-speed gear 30*f* in the direction of the rotational axis CL1. Here, before the third switching mechanism 28*c* is moved, blipping control of raising the rotation speed of the first-speed gear 30*f* to a rotation speed at which the gear-side meshing teeth 70*f* of the first-speed gear 30*f* can mesh with the third meshing teeth 72*c* of the third switching mechanism 28*c* is executed.

A part (f) in FIG. 6 shows a state in which the third meshing teeth 72*c* of the third switching mechanism 28*c* have meshed with the gear-side meshing teeth 70*f* of the first-speed gear 30*f* (i.e., the connected state of the third switching mechanism 28*c*). When blipping control is executed in advance and the third switching mechanism 28c is moved toward the first-speed gear 30f in the direction of the rotational axis CL1, the third meshing teeth 72c of the third switching mechanism 28c and the gear-side meshing teeth 70f of the first-speed gear 30f mesh with each other. Here, the first gear stage 1st is established in which power transmitted from the first-speed gear 30f is transmitted to the output shaft 22 through the third switching mechanism 28c. While FIG. 6 illustrates a downshift from the second gear stage 2nd to the first gear stage 1st as an example, other downshifts (e.g., a downshift from the third gear stage 3rd to the second gear stage 2nd) are performed by the same procedure.

The barrel 40 is driven to rotate by the shifting actuator 41 shown in FIG. 1. The shifting actuator 41 includes a pinion 86 provided on the barrel 40, a rack 88 having teeth 88a that mesh with the pinion 86, and an electrically operated actuator 90 that functions as a driving power source for moving the rack 88. The electrically operated actuator 90 is driven by a command signal output from an electronic control unit 92 (to be described later; see FIG. 8). When the rack 88 is moved in the upshift direction by the electrically operated actuator 90, the barrel 40 is rotated in the upshift direction through the pinion 86. When the rack 88 is moved in the downshift direction by the electrically operated actuator 90, the barrel 40 is rotated in the downshift direction through the pinion 86.

Here, it is conceivable that the barrel 40 may be accidentally rotated in the downshift direction due to malfunction of the electronic control unit 92, failure of the electrically operated actuator 90, etc. in a driving state in which the vehicle travels on power from the engine 12. Then, the transmission 10 is downshifted, for example, from the second gear stage 2nd to the first gear stage 1st. Since the torque of the engine 12 is not reduced during a transition period of the downshift, double meshing may occur in which the gear-side meshing teeth 70f of the first-speed gear 30f and the second meshing teeth 68c or the third meshing teeth 72c of the third switching mechanism 28c mesh with each other while the third meshing teeth 72a and the gear-side meshing teeth 70b of the second-speed gear 30b remain in mesh in the first switching mechanism 28a.

Figure 7A:
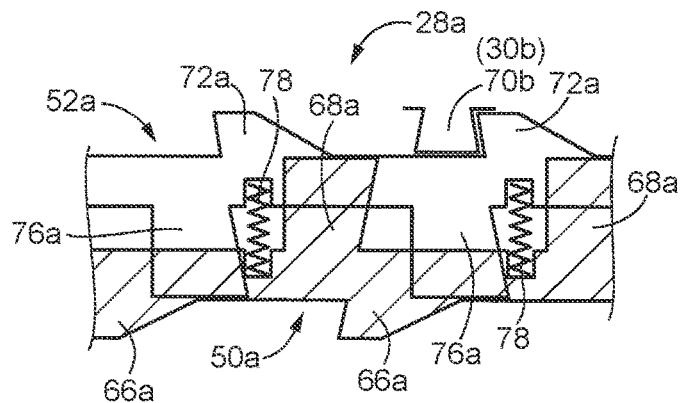
FIG. 7A to 7C are views schematically showing operating states of the first switching mechanism and the third switching mechanism in a case where a barrel is accidentally rotated in a downshift direction during travel in the second gear stage.
Figure 7B:
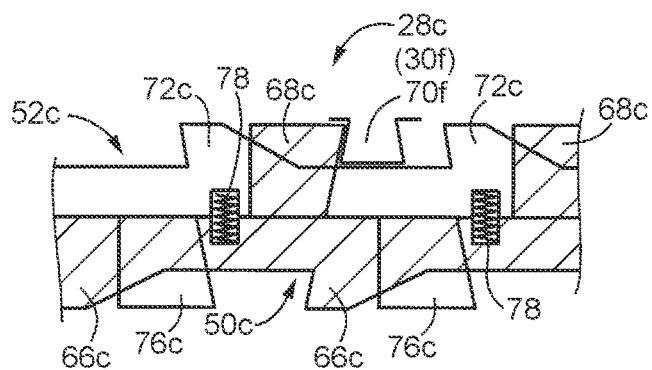
Figure 7C:
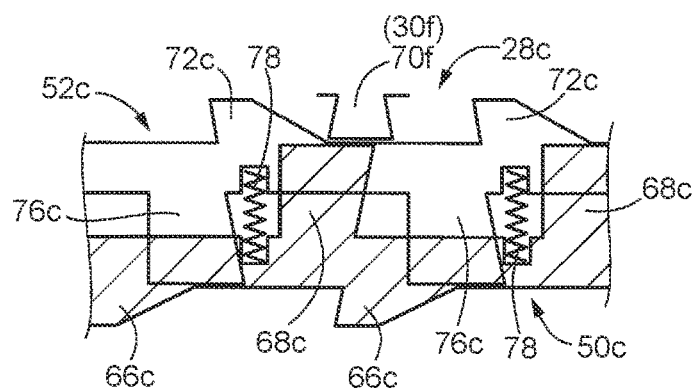

FIG. 7A to FIG. 7C schematically show operating states of the first switching mechanism 28a and the third switching mechanism 28c in a case where the barrel 40 is rotated in the downshift direction due to malfunction of the electronic control unit 92 etc. during travel in the second gear stage 2nd. FIG. 7A corresponds to the first switching mechanism 28a, and FIG. 7B and FIG. 7C correspond to the third switching mechanism 28c. In FIG. 7A to FIG. 7C, a rightward direction, a leftward direction, and an up-down direction in the sheet of the drawing correspond to a forward rotation direction, a backward rotation direction, and the direction of the rotational axis CL1, respectively.

The first switching mechanism 28a of FIG. 7A will be described. Parts of the first dog ring 50a and the second dog ring 52a in the circumferential direction are shown as developed into a plan view. In the first switching mechanism 28a of FIG. 7A, the member located on the upper side and the shaded member located on the lower side in the sheet of the drawing correspond to the second dog ring 52a and the first dog ring 50a, respectively. The first dog ring 50a has been moved in the direction away from the second dog ring 52a as a result of the barrel 40 rotating in the downshift direction during travel in the second gear stage 2nd. Here, since power is transmitted between the gear-side meshing teeth 70b of the second-speed gear 30b and the third meshing teeth 72a of the second dog ring 52a, the gear-side meshing teeth 70b and the third meshing teeth 72a are kept in mesh by friction resistance. As shown in FIG. 7A to FIG. 7C, the gear-side meshing teeth 70b and the third meshing teeth 72a form a wedge structure that makes it difficult for the gear-side meshing teeth 70b and the third meshing teeth 72a to slip out of mesh. Thus, the gear-side meshing teeth 70b and the third meshing teeth 72a are even less likely to slip out of mesh.

The third switching mechanism 28c of FIG. 7B will be described. Parts of the first dog ring 50c and the second dog ring 52c in the circumferential direction are shown as developed into a plan view. In the third switching mechanism 28c of FIG. 7B, the member located on the upper side and the shaded member located on the lower side in the sheet of the drawing correspond to the second dog ring 52c and the first dog ring 50c, respectively. The first dog ring 50c and the second dog ring 52c have been moved toward the first-speed gear 30f as a result of the barrel 40 rotating in the downshift direction during travel in the second gear stage 2nd. Here, since the rotation speed of the first dog ring 50c and the second dog ring 52c is higher than the rotation speed of the first-speed gear 30f, the second meshing teeth 68c of the first dog ring 50c mesh with the gear-side meshing teeth 70f.

The third switching mechanism 28c of FIG. 7C is basically the same as that of FIG. 7B. FIG. 7C shows another aspect of the third switching mechanism 28c when the first dog ring 50c and the second dog ring 52c are moved toward the first-speed gear 30f as a result of the barrel 40 rotating in the downshift direction during travel in the second gear stage 2nd. FIG. 7C shows a state in which the gear-side meshing teeth 70f of the first-speed gear 30f have meshed with the third meshing teeth 72c of the second dog ring 52c, as a result of the first dog ring 50c moving relatively in the direction away from the second dog ring 52c upon the second meshing teeth 68c of the first dog ring 50c coming into contact with the gear-side meshing teeth 70f of the first-speed gear 30f during a transition period in which the first dog ring 50c and the second dog ring 52c move toward the first-speed gear 30f.

Thus, double meshing may occur in which the gear-side meshing teeth 70f and the second meshing teeth 68c or the third meshing teeth 72c mesh with each other in the third switching mechanism 28c while the gear-side meshing teeth 70b and the third meshing teeth 72a remain in mesh in the first switching mechanism 28a. To prevent this, the shifting mechanism 33 is provided with a double-meshing preventing mechanism 100 (see FIG. 8) that can switch between a one-way state in which the barrel 40 is hindered from rotating in the downshift direction and allowed to rotate in the upshift direction and a free state in which the barrel 40 is allowed to rotate in both the upshift direction and the downshift direction. Since the switching mechanism 28 is moved in the upshift direction and the downshift direction through the shifting fork 36 in conjunction with rotation of the barrel 40, it can also be said that the double-meshing preventing mechanism 100 is configured to be able to switch between a one-way state in which the switching mechanism 28 is hindered from moving in the downshift direction and allowed to move in the upshift direction and a free state in which the switching mechanism 28 is allowed to move in both the upshift direction and the downshift direction.

Figure 8:
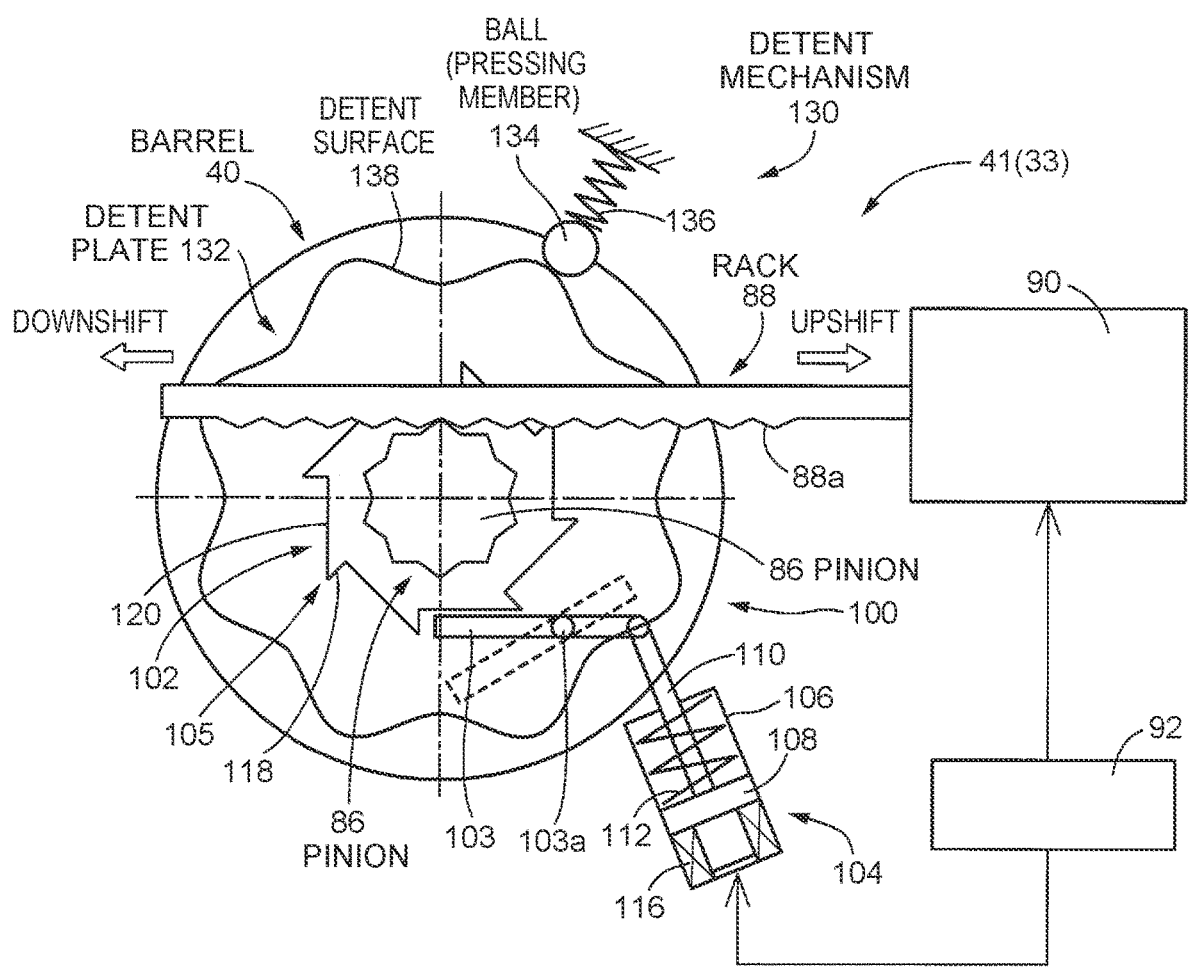
FIG. 8 is a view of a shifting actuator of FIG. 1 as seen from the direction indicated by arrow A.

FIG. 8 is a view of the shifting actuator 41 constituting a part of the shifting mechanism 33, as seen from the direction indicated by arrow A in FIG. 1. As shown in FIG. 8, the shifting actuator 41 includes the pinion 86 that is provided on the barrel 40 and rotates integrally with the barrel 40, the rack 88 having the teeth 88a that mesh with the pinion 86, and the electrically operated actuator 90 that drives the rack 88.

The pinion 86 is integrally provided on the barrel 40 and thereby rotates integrally with the barrel 40. The rack 88 has an elongated shape, and the teeth 88a meshing with the pinion 86 are formed in a portion of the rack 88 that faces the pinion 86, along a longitudinal direction of the rack 88. Therefore, when the rack 88 is moved in the longitudinal direction by the electrically operated actuator 90, the pinion 86 meshing with the teeth 88a of the rack 88 and the barrel 40 are rotated. The electrically operated actuator 90 is controlled by the electronic control unit 92, and is rotated to a rotation position according to a shift signal output from the electronic control unit 92. In FIG. 8, a clockwise direction of the barrel 40 (and the pinion 86), in other words, a direction of the rack 88 moving rightward in the sheet of the drawing, corresponds to the direction in which the transmission 10 is upshifted (upshift direction), and a counterclockwise direction of the barrel 40 (and the pinion 86), in other words, a direction of the rack 88 moving leftward in the sheet of the drawing, corresponds to the direction in which the transmission 10 is downshifted (downshift direction).

The shifting mechanism 33 is provided with the double-meshing preventing mechanism 100. The double-meshing preventing mechanism 100 is configured to be able to switch between the one-way state in which the barrel 40 is hindered from rotating in the downshift direction and allowed to rotate in the upshift direction and the free state in which the barrel 40 is allowed to rotate in both the downshift direction and the upshift direction.

The double-meshing preventing mechanism 100 includes a double-meshing preventing gear 102 provided on the barrel 40, a stopper member 103 configured to be able to come into contact with a ratchet tooth 105 (to be described later) of the double-meshing preventing gear 102, and a switching actuator 104 that switches the turning position of the stopper member 103. A ratchet mechanism that hinders the barrel 40 from rotating in the downshift direction and allows the barrel 40 to rotate in the upshift direction is formed by the double-meshing preventing gear 102 and the stopper member 103.

The double-meshing preventing gear 102 is integrally provided on the barrel 40 and thereby rotates integrally with the barrel 40. The double-meshing preventing gear 102 has at least the same number of ratchet teeth 105 as the number of gear stages of the transmission 10. Each ratchet tooth 105 is formed between a stopper surface 118 that is formed in a direction perpendicular (normal) to the rotation direction of the barrel 40 and an inclined surface 120 that is formed along the rotation direction of the barrel 40.

The stopper member 103 is configured to be able to turn around a turning portion 103a, between a first position and a second position indicated by the solid line and the dashed line, respectively, in FIG. 8. The stopper member 103 is turned by the switching actuator 104.

The switching actuator 104 includes a cylindrical case 106, a piston 108 slidably housed inside the case 106, a rod 110 of which one end (distal end) protrudes from the case 106 and the other end is coupled to the piston 108, a spring 112 that urges the piston 108 in the opposite direction from a direction in which the rod 110 protrudes from the case 106, and a solenoid 116 that generates a thrust force for the piston 108. A switching current (command current) of the switching actuator 104 is supplied from the electronic control unit 92 to the solenoid 116. An end of the stopper member 103 is coupled to the distal end of the rod 110. Therefore, the stopper member 103 is turned according to the position of the distal end of the rod 110.

When no switching current is supplied to the solenoid 116 of the switching actuator 104, the piston 108 is moved by the urging force of the spring 112 toward the opposite side from the side toward which the rod 110 protrudes. Then, the rod 110 is moved to the position indicated by the solid line in conjunction with the piston 108. Moreover, the stopper member 103 is turned in the clockwise direction around the turning portion 103a in conjunction with the rod 110 to assume the first position indicated by the solid line in FIG. 8.

As shown in FIG. 8, when the stopper member 103 is in the first position, the stopper member 103 can come into contact with the stopper surface 118 of the ratchet tooth 105 formed in the double-meshing preventing gear 102, and when the double-meshing preventing gear 102 rotates in the counterclockwise direction, the end of the stopper member 103 comes into contact with the stopper surface 118. Therefore, even when the barrel 40 rotates accidentally in the counterclockwise direction, the barrel 40 is hindered from rotating in the counterclockwise direction as the end of the stopper member 103 comes into contact with the stopper surface 118. Since the counterclockwise direction of the barrel 40 corresponds to the downshift direction of the transmission 10, double meshing of the transmission 10 that occurs when the barrel 40 rotates in the downshift direction is prevented by the double-meshing preventing mechanism 100 as the end of the stopper member 103 comes into contact with the stopper surface 118.

The transmission 10 is set such that, with the stopper member 103 in contact with the stopper surface 118, the switching mechanism 28 is moved to the neutral position in which power transmission between the output shaft 22 and the speed-changing gear 30 is interrupted. In other words, the transmission 10 is set such that, with the stopper member 103 in contact with the stopper surface 118, power transmission between the output shaft 22 and the speed-changing gear 30 is interrupted and the transmission 10 shifts to neutral (power transmission in the transmission 10 is interrupted). Therefore, for example, when failure in which the clutch 16 cannot be disengaged (on-failure) occurs during travel, the transmission 10 can be easily switched to neutral by rotating the barrel 40 in the downshift direction so as to bring the stopper member 103 and the stopper surface 118 into contact with each other.

When the barrel 40 rotates in the clockwise direction with the stopper member 103 turned to the position indicated by the solid line in FIG. 8, the stopper member 103 moves up the inclined surface 120 formed in the double-meshing preventing gear 102, so that the barrel 40 is allowed to rotate. Here, since the clockwise direction of the barrel 40 corresponds to the upshift direction of the transmission 10, the transmission 10 is allowed to upshift with the stopper member 103 turned to the position indicated by the solid line in FIG. 8.

Thus, when no switching current is supplied to the solenoid 116 of the switching actuator 104, the stopper member 103 is moved to the first position indicated by the solid line in FIG. 8, so that the double-meshing preventing mechanism 100 is switched to the one-way state in which the barrel 40 is hindered from rotating in the downshift direction and allowed to rotate in the upshift direction. Therefore, even when the barrel 40 rotates in the downshift direction, i.e., even when the shifting mechanism 33 operates in the direction of moving the switching mechanism 28 toward the downshift side, the operation of the shifting mechanism 33 is hindered as the ratchet tooth 105 and the stopper member 103 come into contact with each other.

On the other hand, when a switching current is supplied from the electronic control unit 92 to the solenoid 116, the piston 108 is moved in the protruding direction of the rod 110 against the urging force of the spring 112. Then, the rod 110 moves in conjunction with the piston 108, causing the stopper member 103 coupled to the distal end of the rod 110 to turn around the turning portion 103a in the counterclockwise direction to the second position indicated by the dashed line. When the stopper member 103 is turned to the second position indicated by the dashed line, the stopper member 103 does not come into contact with the stopper surface 118 of the double-meshing preventing gear 102 regardless of the direction in which the barrel 40 rotates, so that the barrel 40 is allowed to rotate in both the upshift direction and the downshift direction. Thus, when a switching current is supplied to the solenoid 116, the double-meshing preventing mechanism 100 is switched to the free state in which the barrel 40 is allowed to rotate in both the upshift direction and the downshift direction.

The shifting mechanism 33 is further provided with a detent mechanism 130. The detent mechanism 130 is a moderating mechanism that, when the transmission 10 is shifted to a predetermined gear stage, restricts the rotation position of the barrel 40 to a position according to that gear stage. The detent mechanism 130 includes a disc-shaped detent plate 132 that is provided on the barrel 40 and rotated integrally with the barrel 40, a ball 134 that is pressed against a detent surface 138 (to be described later) of the detent plate 132, and a spring 136 that applies an urging force for pressing the ball 134 against the detent plate 132. The ball 134 is one example of the pressing member of the disclosure.

The detent surface 138 having a shape of a periodically changing wave is formed on an outer circumference of the detent plate 132, and the ball 134 is pressed against the detent surface 138. A predetermined gear stage is formed in the transmission 10 in a state where the ball 134 is pressed against the detent surface 138, at the position of a valley 142 formed in the detent surface 138. The number of valleys 142 formed in the detent surface 138 is set to at least the same number as the number of gear stages of the transmission 10.

The ball 134 is set so as to be pressed against a surface located closer to the downshift side than an apex 140 provided in the detent surface 138 is, when the end of the stopper member 103 of the double-meshing preventing mechanism 100 is in contact with the stopper surface 118 of the ratchet tooth 105.

Figure 9:
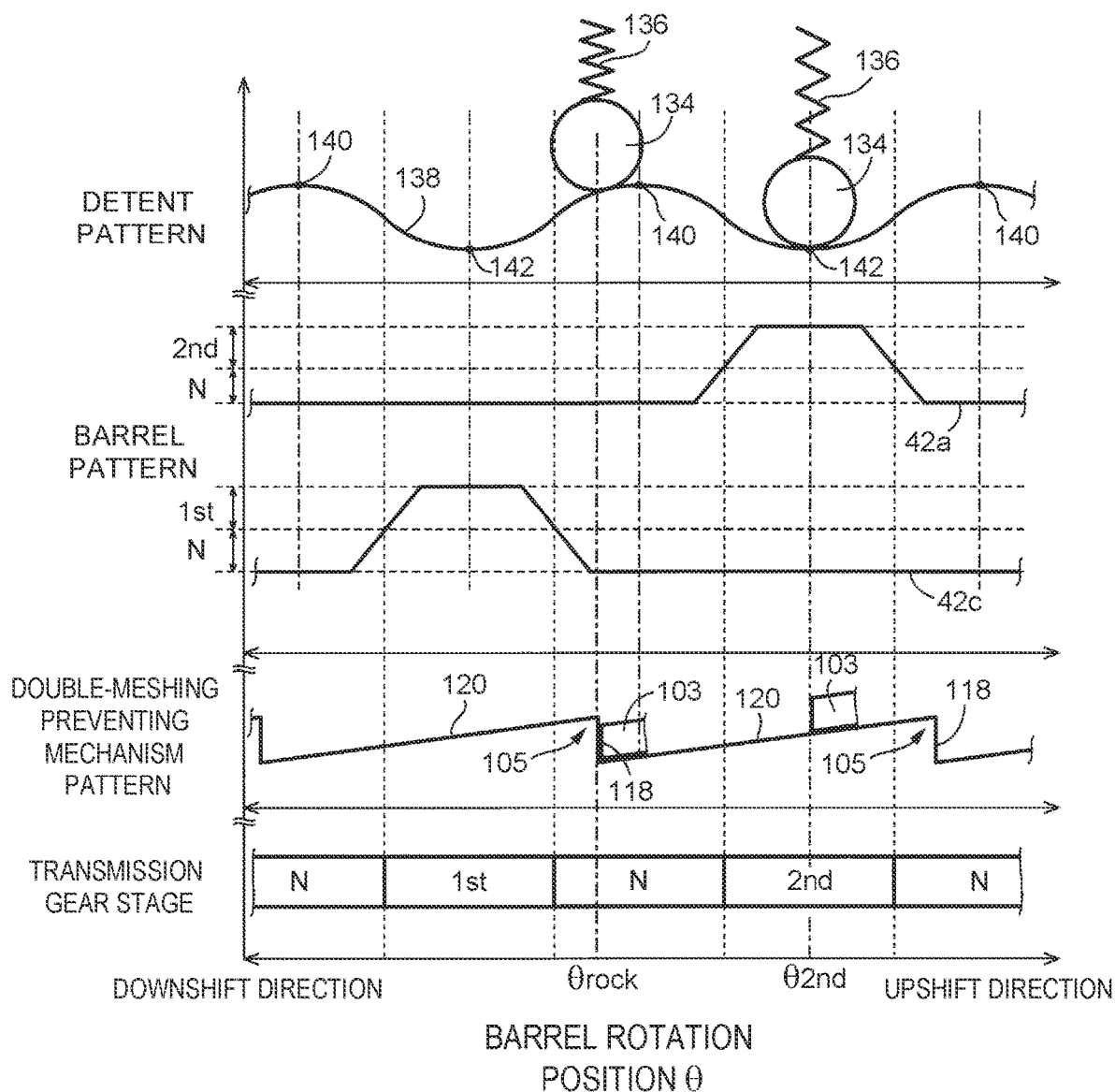
FIG. 9 is a view showing the shape of a detent surface of a detent plate (detent pattern), the shape of a shift groove of a barrel (barrel pattern), the shape of ratchet teeth of a double-meshing preventing mechanism (double-meshing preventing mechanism pattern), and gear stages of the transmission, relative to the rotation position of the barrel.

FIG. 9 shows the shape of the detent surface 138 of the detent plate 132 (detent pattern), the shape of the shift groove 42 of the barrel 40 (barrel pattern), the shape of the ratchet teeth 105 of the double-meshing preventing mechanism 100 (double-meshing preventing mechanism pattern), and the gear stages of the transmission 10, relative to a rotation position θ of the barrel 40. A rightward direction and a leftward direction in the sheet of FIG. 9 correspond to the upshift direction and the downshift direction, respectively, of the transmission 10. While FIG. 9 shows the patterns relative to the rotation position of the barrel 40 only within the range from the first gear stage 1st to the second gear stage 2nd of the transmission 10, the patterns in the other gear stages are similar.

With regard to the detent pattern shown in FIG. 9, the waves formed in the detent surface 138 against which the ball 134 is pressed are shown. Although two balls 134 are shown in FIG. 9, in reality there is only one ball 134. With regard to the barrel pattern, the upper section shows the groove shape of the shift groove 42a with which the shifting fork 36 fitted in the recessed groove 34 of the first switching mechanism 28a is engaged, and the lower section shows the groove shape of the shift groove 42c with which the shifting fork 36 fitted in the recessed groove 34 of the third switching mechanism 28c is engaged. With regard to the double-meshing preventing mechanism pattern, the shape of the ratchet teeth 105 formed in the double-meshing preventing gear 102 is shown.

For example, when the rotation position θ of the barrel 40 is a rotation position θ2nd corresponding to the second gear stage 2nd of the transmission 10, the shift groove 42a of the barrel 40 is located at a position corresponding to the second gear stage 2nd. Then, the shifting fork 36 engaged with the shift groove 42a is moved to a position corresponding to the second gear stage 2nd, and the transmission 10 is shifted to the second gear stage 2nd. The ball 134 is pressed against the detent surface 138 of the detent plate 132, at the position of the valley 142 corresponding to the second gear stage 2nd. The stopper member 103 comes into contact with the inclined surface 120 forming the ratchet tooth 105.

When the barrel 40 rotates in the downshift direction from the rotation position θ2nd to a rotation position θrock at which the stopper member 103 and the stopper surface 118 of the double-meshing preventing mechanism 100 come into contact with each other, the transmission 10 shifts to neutral and the ball 134 is pressed against a surface located closer to the downshift side than the apex 140 of a wave provided in the detent surface 138 of the detent plate 132 is.

The operation of the double-meshing preventing mechanism 100 configured as described above will be described. During travel in a state where the transmission 10 is shifted to a predetermined gear stage, no switching current is supplied from the electronic control unit 92 to the solenoid 116 of the switching actuator 104. Therefore, the stopper member 103 of the double-meshing preventing mechanism 100 is turned to the first position indicated by the solid line in FIG. 8, which creates the one-way state in which the transmission 10 is hindered from downshifting and allowed to upshift. Then, even when the barrel 40 rotates in the downshift direction of the transmission 10 due to malfunction of the electronic control unit 92, failure of the electrically operated actuator 90, etc., the barrel 40 is hindered from rotating in the downshift direction as the stopper member 103 and the stopper surface 118 of the double-meshing preventing gear 102 come into contact with each other. Thus, the transmission 10 is hindered from downshifting, and double meshing associated with a downshift is prevented.

On the other hand, when the barrel 40 rotates in the upshift direction of the transmission 10 due to malfunction of the electronic control unit 92 etc., the double-meshing preventing mechanism 100 allows the transmission 10 to upshift, and therefore the transmission 10 is upshifted. Although the transmission 10 is thus upshifted, double meshing does not occur because a gear change operation is executed without torque reduction or blipping control being executed during a transition period of an upshift of the transmission 10.

The transmission 10 shifts to neutral in a state where the stopper member 103 and the stopper surface 118 of the double-meshing preventing mechanism 100 are in contact with each other. Therefore, when the barrel 40 rotates accidentally in the downshift direction of the transmission 10, the transmission 10 is switched to neutral and the vehicle can travel in a limp home mode in a state where the transmission 10 is in neutral.

When failure in which the clutch 16 between the engine 12 and the transmission 10 seizes up in an engaged state (on-failure) occurs during travel, the transmission 10 can be switched to neutral by rotating the barrel 40 in the downshift direction, without executing elaborate control. Moreover, as the ball 134 of the detent mechanism 130 is pressed against a surface located closer to the downshift side than the apex 140 of the detent surface 138 is, an urging force that rotates the detent plate 132 in the downshift direction is applied through the ball 134 of the detent mechanism 130. Thus, an urging force in the direction of rotating the barrel 40 in the downshift direction is applied. Under this urging force, the stopper member 103 and the stopper surface 118 of the double-meshing preventing mechanism 100 remain in contact with each other, and the transmission 10 can be mechanically held in neutral.

When the transmission 10 is to be downshifted, a switching current is supplied from the electronic control unit 92 to the solenoid 116 of the switching actuator 104. Then, the piston 108 is moved toward the distal end side of the rod 110 against the urging force of the spring 112, and the stopper member 103 coupled to the distal end of the rod 110 is turned to the second position indicated by the dashed line in FIG. 8. Thus, the stopper member 103 and the stopper surface 118 do not come into contact with each other, so that the barrel 40 is allowed to rotate in both the upshift direction and the downshift direction and the transmission 10 can be downshifted. Since the transmission 10 is allowed to upshift even when the double-meshing preventing mechanism 100 is in the one-way state, when the transmission 10 is to be upshifted, the transmission 10 is upshifted without a switching current being supplied to the solenoid 116.

Figure 10:
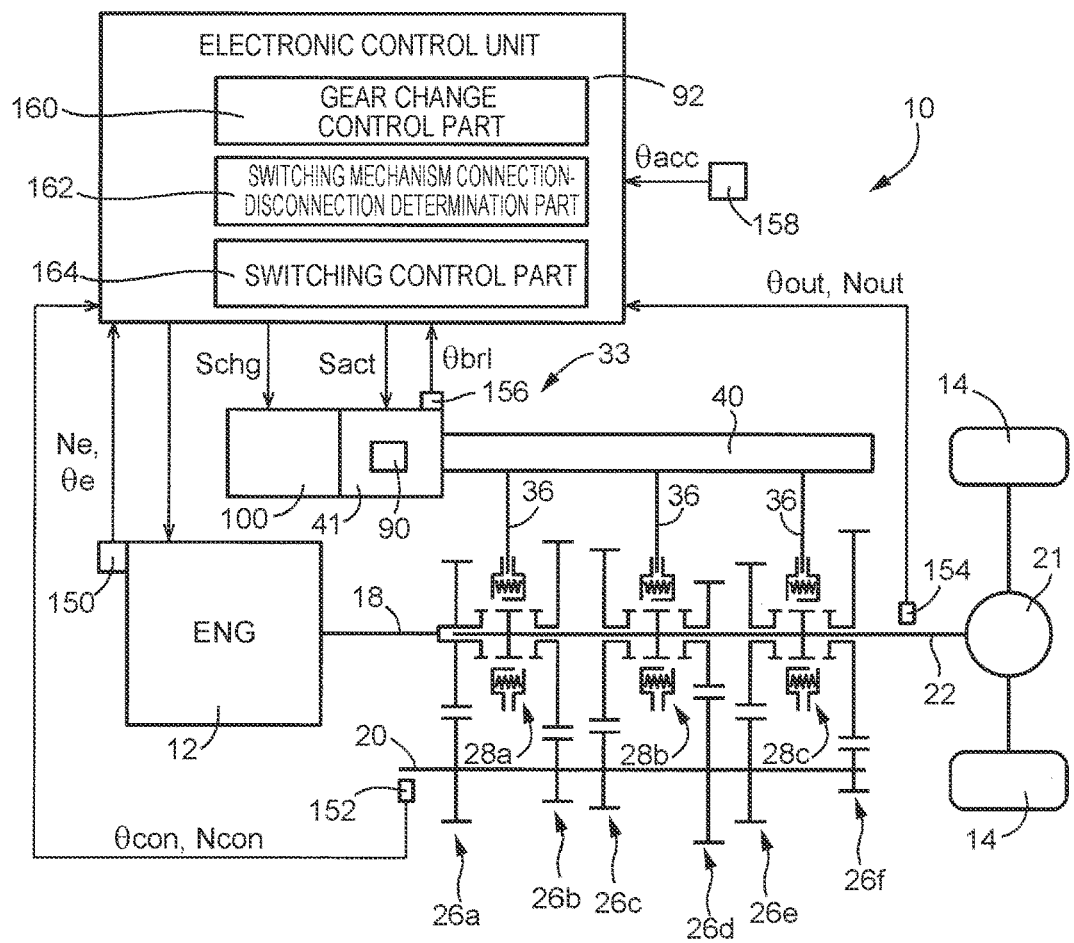
FIG. 10 is a functional block diagram illustrating a control system of an electronic control unit that executes gear change control for the transmission, and a main part of control functions of the electronic control unit.

Next, an operation of the transmission 10 during a transition period of a downshift will be described. FIG. 10 is a functional block diagram illustrating a control system (input and output signals) of the electronic control unit 92 that executes gear change control for the transmission 10, and a main part of control functions of the electronic control unit 92. The transmission 10 shown in FIG. 10 is simplified as necessary. The electronic control unit 92 includes a so-called microcomputer equipped with, for example, a CPU, RAM, ROM, input-output interface, etc., and the CPU executes gear change control for the transmission 10 by performing signal processing in accordance with a program that is stored in the ROM in advance using a temporary storing function of the RAM.

Inputs into the electronic control unit 92 include: a rotation angle θe (crank angle) of the engine 12 detected by a rotation sensor 150 and a signal representing an engine speed Ne; a rotation angle θcon of the counter shaft 20 detected by a rotation sensor 152 and a signal representing a counter shaft rotation speed Ncon; a rotation angle θout of the output shaft 22 detected by a rotation sensor 154 and a signal representing an output shaft rotation speed Nout; a signal representing a rotation angle θbrl of the barrel 40 detected by a rotation sensor 156; and an accelerator operation amount θacc that is an amount of depression (operation) of an accelerator pedal detected by an accelerator operation amount sensor 158.

Outputs from the electronic control unit 92 include an engine output control signal Se for controlling the operating state of the engine 12 during a gear change, a driving signal Sact for the shifting actuator 41 that drives the barrel 40 to rotate, and a switching signal Schg for controlling the operating state of the double-meshing preventing mechanism 100.

The electronic control unit 92 functionally includes a gear change control part 160, for executing gear change control for the transmission 10. Upon determining that the transmission 10 is to be shifted to a predetermined gear stage during travel, the gear change control part 160 rotates the barrel through the electrically operated actuator 90 to a rotation angle θbrl at which the transmission 10 is shifted to the predetermined gear stage. The rotation angles θbrl of the barrel 40 corresponding to the respective gear stages are obtained and stored in advance.

In the following, a downshift of the transmission 10 will be described. Upon determining that the transmission 10 is to be downshifted, the gear change control part 160 rotates the barrel 40 to a rotation angle θbrl at which the switching mechanism 28 that is to be switched to the disconnected state during a downshift is disconnected. Next, the gear change control part 160 reduces the torque of the engine 12 to thereby cause the meshing teeth of the switching mechanism 28 that is to be switched to the disconnected state during a downshift and the gear-side meshing teeth 70 meshing with these meshing teeth to come out of mesh. As a result, the meshing teeth of the switching mechanism 28 that is to be switched to the disconnected state and the gear-side meshing teeth 70 meshing with these meshing teeth come out of mesh, and the switching mechanism 28 is switched to the disconnected state.

Next, the gear change control part 160 executes blipping control of raising a rotation speed N30 of the gear 30 having the gear-side meshing teeth 70 to be meshed during a downshift to a rotation speed Ndog of the switching mechanism 28 that is to be switched to the connected state during a downshift (specifically, to a rotation speed Ndog of the first dog ring 50 and the second dog ring 52 of the switching mechanism 28). When, as a result of blipping control, the rotation speed N30 of the gear 30 is raised to the rotation speed Ndog of the switching mechanism 28 that is to be switched to the connected state during a downshift, the gear change control part 160 further rotates the barrel 40 to thereby move the switching mechanisms 28 that is to be switched to the connected state toward the gear 30 corresponding to a gear stage after a downshift, and cause the meshing teeth of the switching mechanism 28 and the gear-side meshing teeth 70 of the gear 30 to mesh with each other. Thus, the switching mechanism 28 is switched to the connected state and the downshift is completed.

Here, when it is determined that the transmission 10 is to be downshifted, the double-meshing preventing mechanism 100 is switched to the free state to allow a downshift. If the barrel 40 rotates to the rotation angle θbrl at which the switching mechanism 28 that is to be switched to the connected state is connected before the switching mechanism 28 that is to be switched to the disconnected state during a downshift is switched to the disconnected state, double meshing may occur in which the switching mechanism 28 that is to be switched to the disconnected state during a downshift and the switching mechanism 28 that is to be switched to the connected state during a downshift are in the connected state (i.e., a state in which the meshing teeth are meshed) at the same time.

To solve this problem, the electronic control unit 92 functionally includes a neutral determination unit, i.e., a switching mechanism connection-disconnection determination part 162 for determining whether the switching mechanism 28 that is to be disconnected during a downshift has been switched to the disconnected state (dog neutral), and a switching control part 164 for controlling the operation of the double-meshing preventing mechanism 100. The switching mechanism connection-disconnection determination part 162 corresponds to the determination part of the disclosure.

In the following, a downshift from the second gear stage 2nd to the first gear stage 1st will be described as an example. Downshifts for other gear stages are the same as the downshift from the second gear stage 2nd to the first gear stage 1st to be described below, and therefore the description thereof will be omitted. In a downshift from the second gear stage 2nd to the first gear stage 1st, the first switching mechanism 28a is one example of the switching mechanism that is to be switched to the disconnected state during a downshift, and the third switching mechanism 28c is one example of the switching mechanism that is to be switched to the connected state during a downshift.

When a command for downshifting from the second gear stage 2nd to the first gear stage 1st is output, and rotation of the barrel 40 in the downshift direction and torque reduction of the engine 12 are started, the switching mechanism connection-disconnection determination part 162 determines whether the first switching mechanism 28a corresponding to the switching mechanism to be switched to the disconnected state during a downshift of the transmission 10 has been switched to the disconnected state (dog neutral). The switching mechanism connection-disconnection determination part 162 determines whether the third meshing teeth 72a and the gear-side meshing teeth 70b have come out of mesh, i.e., whether the first switching mechanism 28a has been switched to the disconnected state, based on a dog phase calculated from the rotation angle θdog of the first dog ring 50a and the second dog ring 52a (which will be hereinafter collectively referred to as a dog ring DR1) of the first switching mechanism 28a, and from a rotation angle θgear of the second-speed gear 30b having the gear-side meshing teeth 70b that mesh with the third meshing teeth 72a formed in the dog ring DR1.

The rotation angle θdog of the dog ring DR1 is calculated based on the rotation angle θout of the output shaft 22 detected by the rotation sensor 154. This is because the rotation angle θdog of the dog ring DR1 is uniquely determined by the rotation angle θout of the output shaft 22. The rotation angle θgear of the second-speed gear 30b is calculated based on the rotation angle θcon of the counter shaft 20 detected by the rotation sensor 152. This is because the rotation angle θgear of the second-speed gear 30b is uniquely determined by the rotation angle θcon of the counter shaft 20.

The switching mechanism connection-disconnection determination part 162 determines that the switching mechanism 28 has been switched to the disconnected state based on the rotation angle θdog of the dog ring DR1 and the rotation angle θgear of the second-speed gear 30b. That is, the switching mechanism connection-disconnection determination part 162 determines that the switching mechanism 28 has been switched to the disconnected state when the relative position of a predetermined point M in the gear-side meshing teeth 70b formed in the second-speed gear 30b relative to a predetermined reference position o of the dog ring DR1 has changed (i.e., the dog phase has changed) from a position b at which the first switching mechanism 28a is in the connected state, by an amount equal to or larger than a preset threshold value x.

Figure 11:
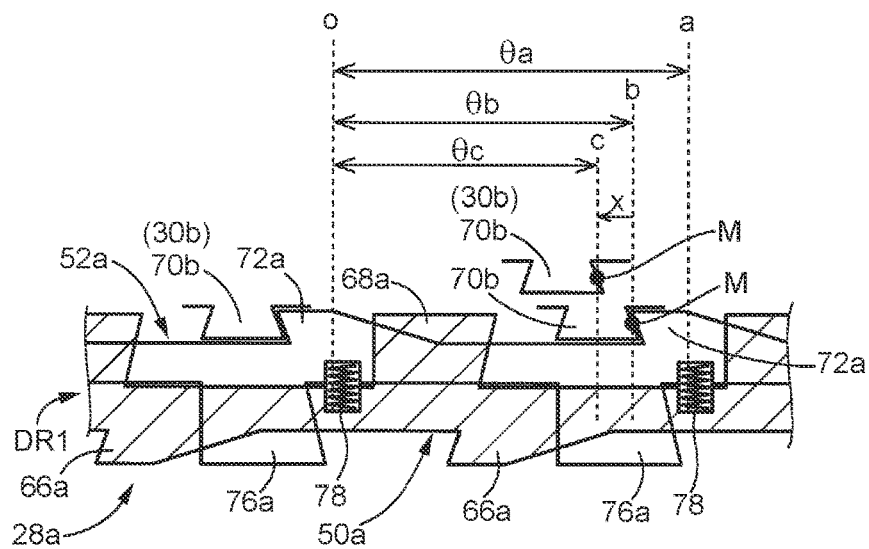
FIG. 11 is a sectional view showing a switching mechanism that is to be switched to a disconnected state during a downshift, and gear-side meshing teeth of a gear that mesh with meshing teeth formed in the switching mechanism, as developed in a rotation direction.

FIG. 11 is a sectional view showing a part of the first switching mechanism 28a that is to be switched to the disconnected state during a downshift from the second gear stage 2nd to the first gear stage 1st, and a part of the gear-side meshing teeth 70b of the second-speed gear 30b meshing with the third meshing teeth 72a formed in the first switching mechanism 28a, as developed in the rotation direction. A right-left direction, a rightward direction, and a leftward direction in the sheet of FIG. 11 correspond to the rotation direction, the forward rotation direction, and the backward rotation direction, respectively. As shown in FIG. 11, in the first switching mechanism 28a that is to be switched to the disconnected state, the position at which the spring 78 is disposed is set as the reference position o of the dog ring DR1. At a position a of the dog ring DR1 having moved (rotated) relatively by a rotation angle θa from the reference position o, the dog ring DR1 has the same phase as at the reference position o. At the position b of the predetermined point M in the gear-side meshing teeth 70b having moved relatively by a rotation angle θb from the reference position o, the gear-side meshing teeth 70b and the third meshing teeth 72a of the switching mechanism 28 mesh with each other, i.e., the first switching mechanism 28a is connected. At a position c of the predetermined point M having moved relatively by the amount of the threshold value x shown in FIG. 11 from the position b, i.e., the position c of the predetermined point M having moved relatively by a rotation angle θc from the reference position o, the gear-side meshing teeth 70b and the third meshing teeth 72a of the first switching mechanism 28a come out of mesh, and the switching mechanism 28 is switched to the disconnected state.

Therefore, the switching mechanism connection-disconnection determination part 162 determines that the switching mechanism 28 has switched to the disconnected state (dog neutral), when the predetermined point M in the gear-side meshing teeth 70b has changed by an amount equal to or larger than the threshold value x, from the position b of the predetermined point M having moved by the rotation angle θb from the reference position o of the dog ring DR1, i.e., when the predetermined point M in the gear-side meshing teeth 70b has reached a position at which the rotation angle from the reference position o of the dog ring DR1 is equal to or smaller than the rotation angle θc. The threshold value x is obtained in advance by experimentation or designing, and is set to a value at which the gear-side meshing teeth 70b and the third meshing teeth 72a come out of mesh and the second dog ring 52a of the first switching mechanism 28a becomes able to move toward the first dog ring 50a under the urging force of the springs 78.

When the switching mechanism connection-disconnection determination part 162 determines that the first switching mechanism 28a has been switched to the disconnected state, the switching control part 164 operates the switching actuator 104 of the double-meshing preventing mechanism 100 and switches the double-meshing preventing mechanism 100 to the free state. Then, the downshift of the transmission 10 is allowed to proceed. In other words, unless the first switching mechanism 28a is switched to the disconnected state during a transition period of a downshift of the transmission 10, the barrel 40 is hindered from rotating toward the downshift side by the double-meshing preventing mechanism 100, so that double meshing during a transition period of a downshift is reliably prevented.

Figure 12:
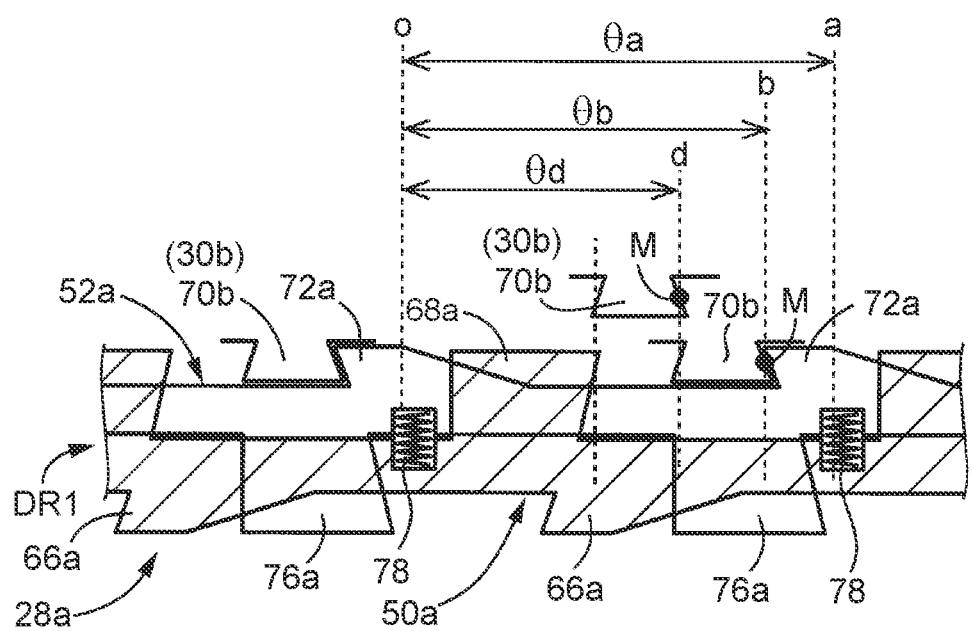
FIG. 12 is a sectional view showing the switching mechanism that is to be switched to the disconnected state during a downshift, and the gear-side meshing teeth of the gear that mesh with the meshing teeth formed in the switching mechanism, as developed in the rotation direction.

Here, whether the first switching mechanism 28a has switched to the disconnected state during a downshift can be determined by the following method other than the above-described determination method. Like FIG. 11, FIG. 12 is a sectional view showing a part of the first switching mechanism 28a that is to be switched to the disconnected state during a downshift from the second gear stage 2nd to the first gear stage 1st, and a part of the gear-side meshing teeth 70b of the second-speed gear 30b meshing with the third meshing teeth 72a formed in the first switching mechanism 28a, as developed in the rotation direction. Also in FIG. 12, the position at which the spring 78 is disposed in the dog ring DR1 is set as the reference position o. At a position a of the dog ring DR1 having moved (rotated) relatively by a rotation angle θa from this reference position, the dog ring DR1 has the same phase as at the reference position o. At a position b of the predetermined point M in the gear-side meshing teeth 70b having moved relatively by a rotation angle θb from the reference position o, the gear-side meshing teeth 70b and the third meshing teeth 72a of the first switching mechanism 28a mesh with each other, i.e., the first switching mechanism 28a is connected. At a position d of the predetermined point M in the gear-side meshing teeth 70b having moved relatively by a rotation angle θd from the reference position o, the gear-side meshing teeth 70b mesh with the second meshing teeth 68a of the first switching mechanism 28a. The second meshing teeth 68a are meshing teeth that mesh with the gear-side meshing teeth 70b when the vehicle is driven. When the predetermined point M in the gear-side meshing teeth 70b reaches the position d or a position closer to the reference position o, the gear-side meshing teeth 70b and the second meshing teeth 68a come out of mesh and the first switching mechanism 28a is disconnected.

Therefore, the switching mechanism connection-disconnection determination part 162 determines that the first switching mechanism 28a has switched to the disconnected state, when the predetermined point M in the gear-side meshing teeth 70 has reached the position d at which the predetermined point M has moved relatively by the rotation angle θd from the reference position o or a position closer to the reference position o.

Whether the first switching mechanism 28a has switched to the disconnected state during a downshift can also be determined based on a rotation speed difference ΔN (=|Ndog−N30b|) between the rotation speed Ndog of (the dog ring DR1 of) the first switching mechanism 28a and the rotation speed N30b of the second-speed gear 30b. The rotation speed Ndog of the first switching mechanism 28a is calculated based on the output shaft rotation speed Nout of the output shaft 22 detected by the rotation sensor 154. The rotation speed N30b of the second-speed gear 30b is calculated based on the counter shaft rotation speed Ncon of the counter shaft 20 detected by the rotation sensor 152 and on the gear ratio γ in the second gear stage 2nd.

When the first switching mechanism 28a is switched to the disconnected state as the torque of the engine 12 is reduced during a downshift, a rotation speed difference ΔN occurs between the rotation speed Ndog of the first switching mechanism 28a and the rotation speed N30b of the second-speed gear 30b that has been rotating integrally with the first switching mechanism 28a. The switching mechanism connection-disconnection determination part 162 determines that the first switching mechanism 28a has switched to the disconnected state, when the rotation speed difference ΔN between the rotation speed Ndog of the dog ring and the rotation speed N30 of the gear 30 has become equal to or larger than a preset predetermined value during a downshift.

Whether the first switching mechanism 28a has switched to the disconnected state during a downshift can also be determined based on a change in the gear ratio γ (=counter shaft rotation speed Ncon/output shaft rotation speed Nout) of the transmission 10. The gear ratio γ of the transmission 10 changes when the torque of the engine 12 is reduced during a downshift and the first switching mechanism 28a is switched to the disconnected state. The switching mechanism connection-disconnection determination part 162 determines that the first switching mechanism 28a has switched to the disconnected state, when the gear ratio γ has changed during a downshift by an amount equal to or larger than a predetermined value, from the gear ratio γ in the second gear stage 2nd before a downshift.

Whether the first switching mechanism 28a has switched to the disconnected state during a downshift can also be determined based on a change rate Δγ of the gear ratio γ. The change rate Δγ of the gear ratio γ is a change in the gear ratio γ per unit time and is calculated based on the gear ratio γ that is calculated as needed. When the first switching mechanism 28a switches to the disconnected state as the torque of the engine 12 is reduced during a downshift, the change rate Δγ of the gear ratio γ changes as the gear ratio γ changes. The switching mechanism connection-disconnection determination part 162 determines that the first switching mechanism 28a has switched to the disconnected state when the change rate Δγ of the gear ratio γ has become a predetermined value or higher during a downshift.

Figure 13:
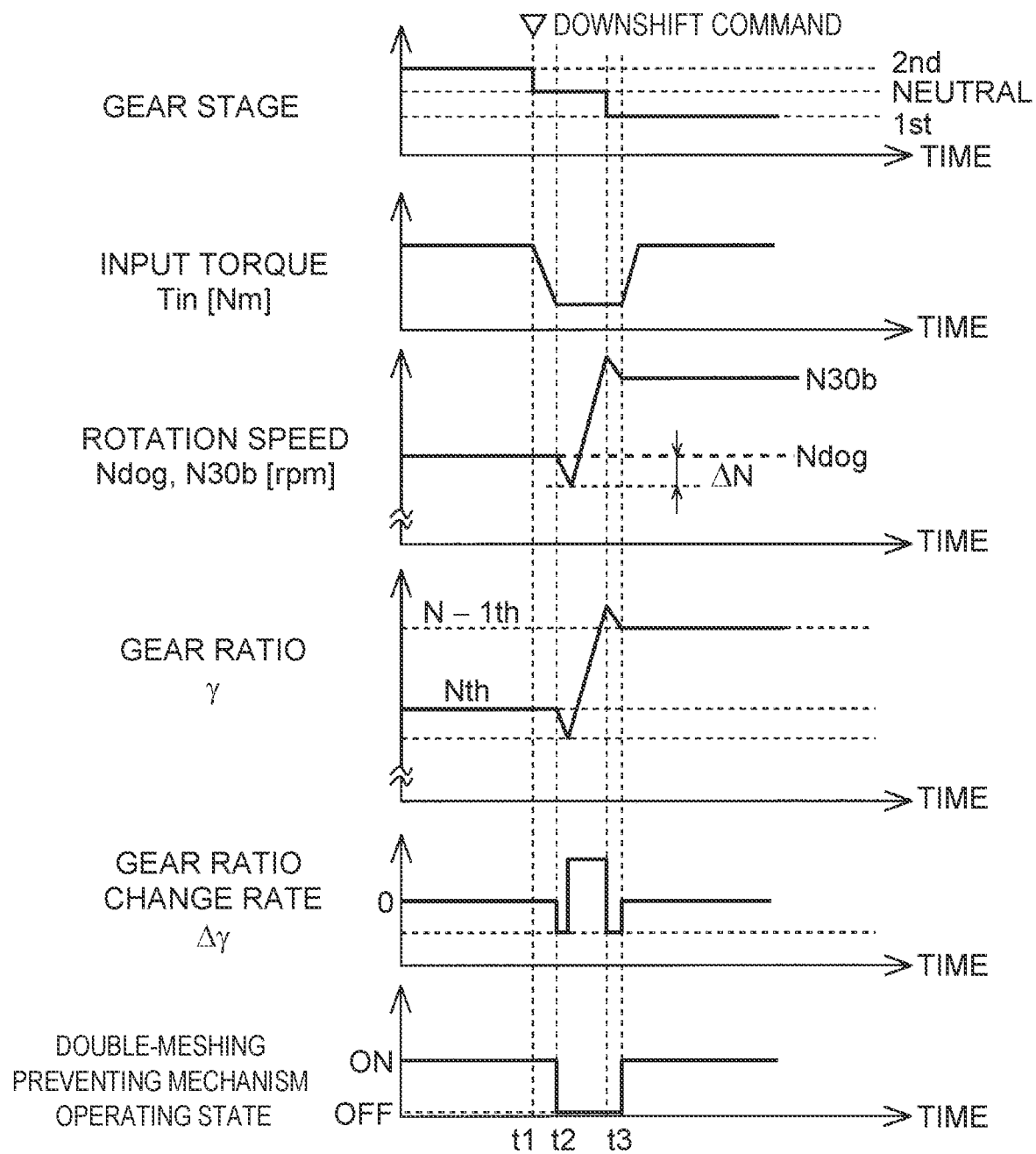
FIG. 13 is a time chart showing operating states during a transition period of a downshift of the transmission.

FIG. 13 is a time chart showing operating states during a transition period of a downshift of the transmission 10 from the second gear stage 2nd to the first gear stage 1st. At time t1 shown in FIG. 13, a downshift command for the transmission 10 is output and a downshift is started. Then, torque reduction of the engine 12 is started at time t1, and an input torque Tin input into the transmission 10 decreases. At time t2, the first switching mechanism 28a switches to the disconnected state, so that a rotation speed difference ΔN occurs between the rotation speed N30b and the rotation speed Ndog. Since the torque of the engine 12 is reduced, the rotation speed N30b of the second-speed gear 30b decreases when the first switching mechanism 28a switches to the disconnected state, resulting in the rotation speed difference ΔN. When the rotation speed difference ΔN becomes equal to or larger than a predetermined value, the first switching mechanism 28a is determined to have switched to the disconnected state, and the double-meshing preventing mechanism 100 is switched to the free state (OFF) at time t3.

As the first switching mechanism 28a is switched to the disconnected state, the gear ratio γ of the transmission 10 changes. The input shaft rotation speed Nin decreases as a result of the torque reduction, so that, immediately after the switching mechanism 28 switches to the disconnected state, the gear ratio γ changes so as to decrease. When the change in the gear ratio γ becomes equal to or larger than a predetermined value, the first switching mechanism 28a is determined to have switched to the disconnected state, and the double-meshing preventing mechanism 100 is switched to the free state (OFF) at time t3.

As the first switching mechanism 28a is switched to the disconnected state, the change rate Δγ of the gear ratio γ changes. Since the torque is reduced, immediately after the first switching mechanism 28a switches to the disconnected state, the gear ratio γ changes so as to decrease, and the change rate Δγ of the gear ratio γ changes in a negative direction accordingly. When the change rate Δγ of the gear ratio γ becomes equal to or higher than a predetermined value, the switching mechanism 28 is determined to have switched to the disconnected state, and the double-meshing preventing mechanism 100 is switched to the free state (OFF) at time t3.

Whether the first switching mechanism 28a has switched to the disconnected state during a downshift can also be determined based on whether an engine torque Te of the engine 12 has become equal to or smaller than a preset threshold value Y.

When a downshift of the transmission 10 is started, the torque of the engine 12 is reduced, so that the engine torque Te decreases. When the torque of the engine 12 is reduced and, as a result, an urging force Fsp of the springs 78 of the switching mechanism 28 acting between the first dog ring 50a and the second dog ring 52a becomes larger than a friction force Ffri occurring between contact surfaces of the third meshing teeth 72a of the first switching mechanism 28a and the gear-side meshing teeth 70b meshing with the third meshing teeth 72a, the second dog ring 52a is moved by the urging force of the springs 78 and the third meshing teeth 72a and the gear-side meshing teeth 70b come out of mesh. Thus, the first switching mechanism 28a is switched to the disconnected state.

Figure 14:
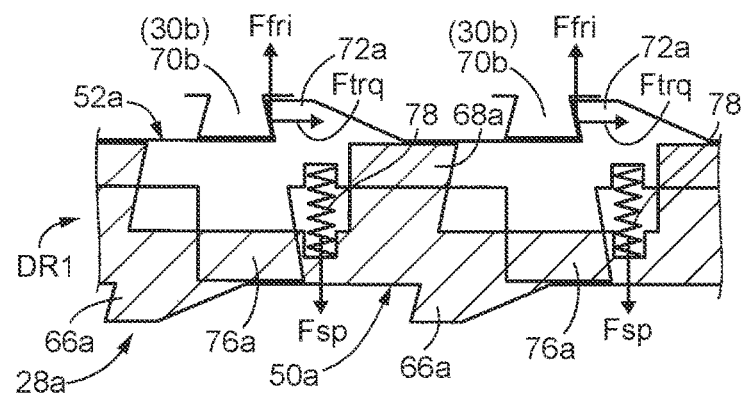
FIG. 14 is a view showing a relation among forces acting on the switching mechanism immediately after a downshift is started.

FIG. 14 shows a relation among forces acting on the first switching mechanism 28a at a point before the first switching mechanism 28a switches to the disconnected state during a downshift from the second gear stage 2nd to the first gear stage 1st. When a downshift is started, the first dog ring 50a and the second dog ring 52a making a pair of the first switching mechanism 28a are separated from each other. Then, the springs 78 are elastically deformed, exerting the urging force Fsp that acts in the direction in which the dog rings 50a, 52a are drawn toward each other. As torque is transmitted from the engine 12, a pressing force Ftrq due to the torque acts on the contact surfaces of the gear-side meshing teeth 70b and the third meshing teeth 72a of the second dog ring 52a meshing with the gear-side meshing teeth 70b. In addition, a friction force Ffri based on the pressing force Ftrq and a coefficient µ of friction between the contact surfaces acts on the contact surfaces. The friction force Ffri becomes smaller as the pressing force Ftrq becomes smaller. When the friction force Ffri becomes smaller than the urging force Fsp of the springs 78, the second dog ring 52a is drawn toward the first dog ring 50a by the urging force Fsp of the springs 78, so that the gear-side meshing teeth 70b and the third meshing teeth 72a come out of mesh. Here, the threshold value Y of the engine torque Te is set to a threshold value at which the urging force Fsp of the springs 78 becomes larger than the friction force Ffri.

With the threshold value Y thus set, when the engine torque Te becomes equal to or smaller than the threshold value Y, the urging force Fsp of the springs 78 becomes larger than the friction force Ffri. As a result, the second dog ring 52a of the first switching mechanism 28a is moved by the springs 78, so that the third meshing teeth 72a of the second dog ring 52a and the gear-side meshing teeth 70b come out of mesh and the first switching mechanism 28a is switched to the disconnected state. Therefore, the switching mechanism connection-disconnection determination part 162 can determine whether the first switching mechanism 28a has switched to the disconnected state based on whether the engine torque Te has become equal to or smaller than the threshold value Y. For example, the engine torque Te is detected by a torque sensor mounted on the engine 12.

Figure 15:
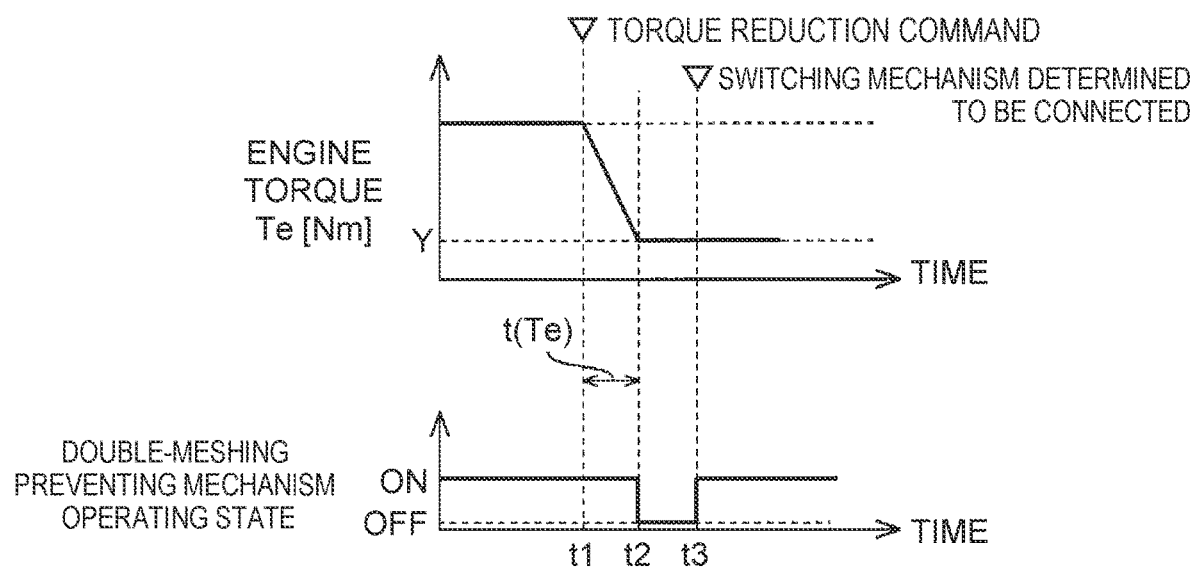
FIG. 15 is a time chart showing an operating state during a transition period of a downshift of the transmission.

Whether the switching mechanism 28 has switched to the disconnected state during a downshift can also be determined based on whether a predetermined time t (Te) has elapsed after torque reduction of the engine 12 is ordered (i.e., a torque reduction command is output). FIG. 15 is a time chart showing the engine torque Te and an operating state of the double-meshing preventing mechanism 100 when the torque reduction command is output. When a downshift command for the transmission 10 is output at time t1 of FIG. 15, torque reduction of the engine 12 is started. When the engine torque Te becomes equal to the threshold value Y, the first switching mechanism 28a switches to the disconnected state. Here, the predetermined time t (Te) is set to a value at which the engine torque Te becomes equal to the threshold value Y. Therefore, when the predetermined time t (Te) has elapsed after torque reduction is ordered, the urging force Fsp of the springs 78 becomes larger than the friction force Ffri. As a result, the second dog ring 52a is moved by the urging force Fsp of the springs 78, so that the third meshing teeth 72a of the second dog ring 52a and the gear-side meshing teeth 70b come out of mesh and the first switching mechanism 28a is switched to the disconnected state. At time t2 of FIG. 15, the first switching mechanism 28a is determined to have switched to the disconnected state, and therefore the double-meshing preventing mechanism 100 is switched to the free state (OFF).

Here, the predetermined time t (Te) required for the urging force Fsp of the springs 78 to become larger than the friction force Ffri varies depending on the engine torque Te at the point when torque reduction is ordered. Therefore, the predetermined time t (Te) is changed according to the engine torque Te at the point when torque reduction is ordered. The switching mechanism connection-disconnection determination part 162 stores a relation map that shows the engine torque Te and is used to obtain the predetermined time t (Te), and obtains the predetermined time t (Te) by applying to this relation map the engine torque Te at the point when torque reduction is started. When the obtained predetermined time t (Te) has elapsed after torque reduction is ordered, the switching mechanism connection-disconnection determination part 162 determines that the first switching mechanism 28a has switched to the disconnected state. The relation map is obtained by experimentation or designing and stored in advance, and is set such that the predetermined time t (Te) at which the urging force Fsp of the springs 78 becomes larger than the friction force Ffri can be obtained based on the engine torque Te.

When whether the first switching mechanism 28a has switched to the disconnected state during a downshift is determined based on one of the above-described determination methods, and the first switching mechanism 28a is determined to have switched to the disconnected state, the double-meshing preventing mechanism 100 is switched to the free state and double meshing during a downshift is thereby reliably prevented.

When a gear change proceeds as the double-meshing preventing mechanism 100 is switched to the free state during a downshift of the transmission 10, and the third switching mechanism 28c that is the switching mechanism to be switched to the connected state during a downshift from the second gear stage 2nd to the first gear stage 1st is determined to have been switched to the connected state, the downshift is determined to have completed and the switching control part 164 switches the double-meshing preventing mechanism 100 to the one-way state. Here, the switching mechanism connection-disconnection determination part 162 determines whether the third switching mechanism 28c that is to be switched to the connected state during a downshift has switched to the connected state.

The switching mechanism connection-disconnection determination part 162 determines whether the third meshing teeth 72c and the gear-side meshing teeth 70f have meshed with each other, i.e., whether the third switching mechanism 28c has been switched to the connected state, based on a dog phase calculated from the rotation angle θdog of the third switching mechanism 28c to be switched to the connected state during a downshift from the second gear stage 2nd to the first gear stage 1st, and from the rotation angle θgear of the first-speed gear 30f having the gear-side meshing teeth 70f that mesh with the third meshing teeth 72c of the third switching mechanism 28c during a downshift.

When the first switching mechanism 28a of FIG. 11 is replaced by the third switching mechanism 28c to be switched to the connected state during a downshift, the third switching mechanism 28c is switched to the connected state in which the gear-side meshing teeth 70f and the third meshing teeth 72c of the third switching mechanism 28c mesh with each other, when a predetermined point M in the gear-side meshing teeth 70f has moved to the position b at which the predetermined point M has moved relatively by the rotation angle θb from the reference position o of the third switching mechanism 28c. Therefore, the switching mechanism connection-disconnection determination part 162 determines that the third switching mechanism 28c has switched to the connected state, when the predetermined point M in the gear-side meshing teeth 70f has reached the position b at which the predetermined point M has moved by the rotation angle θb from the reference position o of the third switching mechanism 28c.

The switching mechanism connection-disconnection determination part 162 can also make this determination based on the gear ratio γ of the transmission 10. When the third switching mechanism 28c switches to the connected state, the gear ratio γ becomes the gear ratio γ corresponding to the first gear stage 1st that is a gear stage after a downshift. The switching mechanism connection-disconnection determination part 162 calculates the gear ratio γ as needed, and determines that the third switching mechanism 28c has switched to the connected state when the gear ratio γ has become the gear ratio γ corresponding to the gear stage after a downshift.

When the switching mechanism connection-disconnection determination part 162 determines that the third switching mechanism 28c has been switched to the connected state during a downshift, the switching control part 164 switches the double-meshing preventing mechanism 100 to the one-way state, so that the barrel 40 is restrained from rotating toward the downshift side and double meshing due to the barrel 40 rotating accidentally toward the downshift side is reliably prevented.

Figure 16:
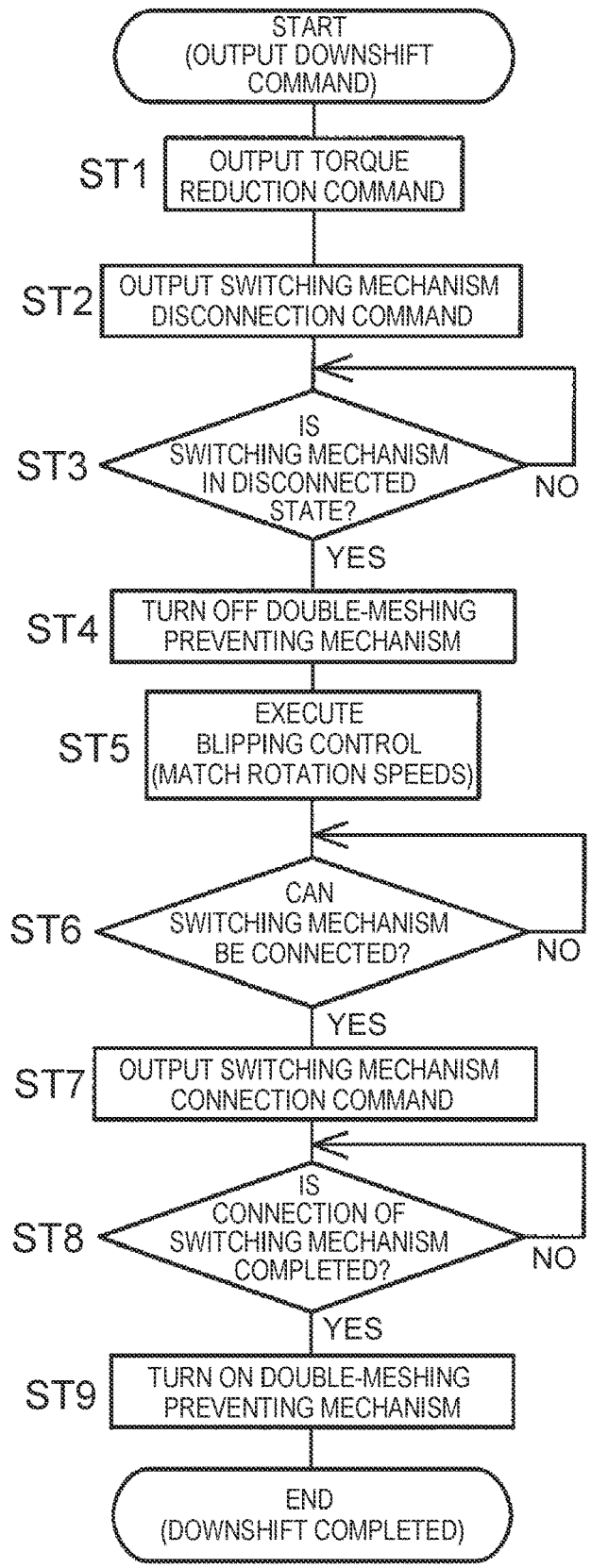
FIG. 16 is a flowchart illustrating a main part of a control operation of the electronic control unit, and illustrating a control operation for reliably preventing double meshing that occurs during a downshift of the transmission.

FIG. 16 is a flowchart illustrating a main part of a control operation of the electronic control unit 92, and illustrating a control operation for reliably preventing double meshing that occurs during a downshift of the transmission 10 from the second gear stage 2nd to the first gear stage 1st. This flowchart is executed when a downshift command for the transmission 10 is output.

When a downshift command for the transmission 10 is output, torque reduction of the engine 12 is started in step ST1 (hereinafter "step" is omitted) corresponding to the control function of the gear change control part 160. Next, in ST2 corresponding to the control function of the gear change control part 160, the barrel 40 is rotated toward the downshift side, and an urging force in the direction of causing the third meshing teeth 72a and the gear-side meshing teeth 70b to come out of mesh is applied through the shifting mechanism 33 to the first switching mechanism 28a that is to be switched to the disconnected state during a downshift. Here, the first dog ring 50a of the first switching mechanism 28a is moved after a downshift is started, while the second dog ring 52a having the third meshing teeth 72a that mesh with the gear-side meshing teeth 70b is kept in position by the friction force Ffri acting between the contact surfaces of the gear-side meshing teeth 70b and the third meshing teeth 72a. When the urging force Fsp of the springs 78 becomes larger than the friction force Ffri as a result of torque reduction of the engine 12, the second dog ring 52a is moved in the direction away from the second-speed gear 30b by the urging force Fsp of the springs 78, so that the gear-side meshing teeth 70 and the meshing teeth of the dog ring come out of mesh and the switching mechanism 28 is switched to the disconnected state.

In ST3 corresponding to the control function of the switching mechanism connection-disconnection determination part 162, it is determined whether the switching mechanism 28 has switched to the disconnected state. When the determination in ST3 is negative, the same step is repeatedly executed until the determination in ST3 becomes affirmative. When the determination in ST3 is affirmative, in ST4 corresponding to the control function of the switching control part 164, the double-meshing preventing mechanism 100 is switched to the free state (OFF) and the downshift is allowed to proceed. In ST5 corresponding to the control function of the gear change control part 160, blipping control of raising the rotation speed of the first-speed gear 30f to be connected during a downshift to the rotation speed of the third switching mechanism 28c is executed.

In ST6 corresponding to the control function of the gear change control part 160, it is determined whether the third switching mechanism 28c can be switched to the connected state based on whether the rotation speed of the first-speed gear 30f has risen to the rotation speed of the third switching mechanism 28c. When the determination in ST6 is negative, the same step is repeatedly executed until the determination in ST6 becomes affirmative. When the determination in ST6 is affirmative, in ST7 corresponding to the control function of the gear change control part 160, the third switching mechanism 28c is moved toward the first-speed gear 30f. In ST8 corresponding to the control function of the switching mechanism connection-disconnection determination part 162, it is determined whether the third switching mechanism 28c has switched to the connected state (whether connection is completed). When the determination in ST8 is negative, the same step is repeatedly executed until the determination in ST8 becomes affirmative. When the determination in ST8 is affirmative, in ST9 corresponding to the control function of the switching control part 164, the double-meshing preventing mechanism 100 is switched to the one-way state (ON), and the current routine is ended (downshift completed).

As described above, in this embodiment, the double-meshing preventing mechanism 100, when switched to the one-way state, hinders the barrel 40 of the shifting mechanism 33 from rotating in the downshift direction even when the barrel 40 rotates accidentally in the downshift direction during travel due to failure of the shifting actuator 41 that operates the shifting mechanism 33, etc. As a result, double meshing resulting from the switching mechanism 28 moving in the downshift direction can be prevented. When the transmission 10 is to be downshifted, the double-meshing preventing mechanism 100 is switched to the free state to allow a downshift, so that the transmission 10 can be downshifted.

In this embodiment, power transmission between the output shaft 22 and the speed-changing gear 30 is interrupted when the ratchet tooth 105 and the stopper member 103 of the double-meshing preventing mechanism 100 are in contact with each other. Therefore, for example, when failure in which the clutch 16 disposed between the engine 12 and the transmission 10 seizes up in the engaged position occurs, power transmission in the transmission 10 can be easily interrupted by operating the shifting mechanism 33 in the downshift direction so as to bring the ratchet tooth 105 and the stopper member 103 into contact with each other. Moreover, the ball 134 of the detent mechanism 130 is pressed against a surface located closer to the downshift side than the apex 140 provided in the detent surface 138 is, when the ratchet tooth 105 and the stopper member 103 of the double-meshing preventing mechanism 100 are in contact with each other, and thus an urging force is exerted by the detent mechanism 130 in the direction of rotating the barrel 40 in the downshift direction. Therefore, the ratchet tooth 105 and the stopper member 103 can be mechanically held in contact with each other.

In this embodiment, the double-meshing preventing mechanism 100 is switched to the free state when it is determined that the switching mechanism 28 to be switched to the disconnected state during a downshift of the transmission 10 has been switched to the disconnected state. Thus, double meshing during a downshift can be reliably prevented. When the switching mechanism 28 to be switched to the connected state during a downshift of the transmission 10 is switched to the connected state, the double-meshing preventing mechanism 100 is switched to the one-way state. Therefore, even when the shifting mechanism 33 thereafter operates accidentally in the downshift direction, the downshift is hindered by the double-meshing preventing mechanism 100 and double meshing can be reliably prevented.

Next, another embodiment of the disclosure will be described. In the following description, parts that are the same as in the above embodiment will be denoted by the same reference signs and the description thereof will be omitted.

Figure 17:
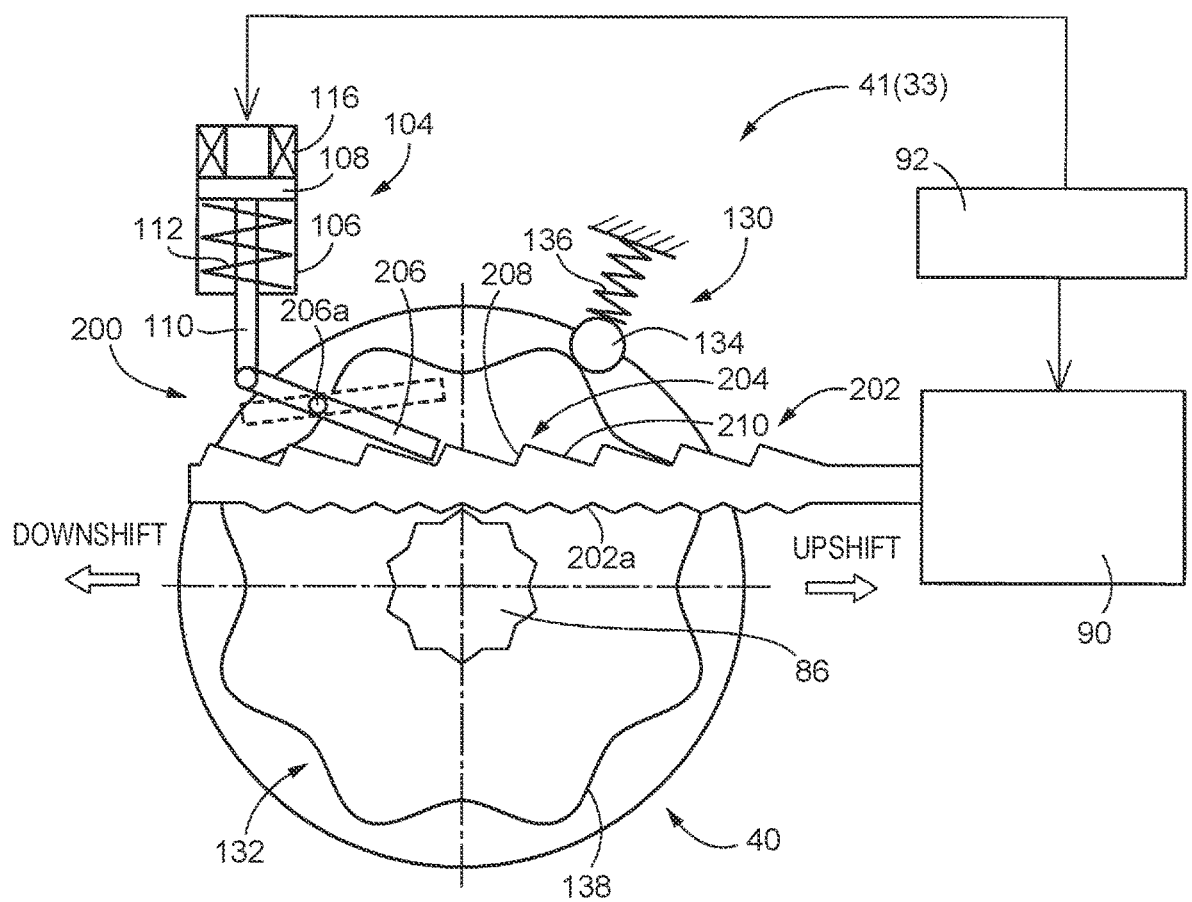
FIG. 17 is a view showing the structure of a double-meshing preventing mechanism corresponding to another embodiment of the disclosure.

FIG. 17 shows the structure of a double-meshing preventing mechanism 200 corresponding to another embodiment of the disclosure. The double-meshing preventing mechanism 200 is also configured to be able to switch between a one-way state in which the barrel 40 is hindered from rotating in the downshift direction and allowed to rotate in the upshift direction and a free state in which the barrel 40 is allowed to rotate in both the downshift direction and the upshift direction. The double-meshing preventing mechanism 200 of this embodiment is configured to hinder the barrel 40 from rotating in the downshift direction by restraining a rack 202 from moving. In FIG. 17, a clockwise direction of the barrel 40 (and the pinion 86), in other words, a direction of the rack 202 moving rightward in the sheet of the drawing, corresponds to the direction in which the transmission 10 is upshifted (upshift direction), and a counterclockwise direction of the barrel 40 (and the pinion), in other words, a direction of the rack 202 moving leftward in the sheet of the drawing, corresponds to the direction in which the transmission 10 is downshifted (downshift direction).

The double-meshing preventing mechanism 200 includes sawtooth-shaped ratchet teeth 204 provided in the rack 202 that is driven by the electrically operated actuator 90, a stopper member 206 configured to be able to mesh with the ratchet teeth 204, and the switching actuator 104 that switches the turning position of the stopper member 206. Since the structure of the switching actuator 104 is basically the same as that in the above embodiment, the parts of the switching actuator 104 will be denoted by the same reference signs and the description thereof will be omitted.

The ratchet teeth 204 are formed in a portion of the rack 202 on the opposite side from teeth 202a of the rack 202 that mesh with the pinion 86, along a longitudinal direction of the rack 202. At least the same number of ratchet teeth 204 as the number of gear stages of the transmission 10 are formed. Each ratchet tooth 204 is formed between a stopper surface 208 that is formed in a direction perpendicular to a moving direction of the rack 202, at a predetermined inclination angle relative to the moving direction, and an inclined surface 210 that is formed at a predetermined inclination angle relative to the moving direction of the rack 202.

The stopper member 206 is configured to be able to turn around a turning portion 206a. The stopper member 206 is turned by the switching actuator 104.

When no switching current is supplied to the solenoid 116 of the switching actuator 104, the piston 108 is moved toward the opposite side from the distal end of the rod 110 by the urging force of the spring 112. Then, the rod 110 is moved to the position indicated by the solid line in FIG. 17 in conjunction with the piston 108. Since the stopper member 206 is coupled to the distal end of the rod 110, the stopper member 206 is turned in the clockwise direction around the turning portion 206a in conjunction with the rod 110 to assume a first position indicated by the solid line in FIG. 17.

Then, the stopper member 206 becomes able to come into contact with the stopper surface 208 of the ratchet tooth 204, and the stopper member 206 comes into contact with the stopper surface 208 when the rack 202 moves in the downshift direction (the leftward direction in the sheet of the drawing). Therefore, even when the rack 202 moves accidentally in the downshift direction, the rack 202 is hindered from moving in the downshift direction, i.e., the barrel 40 is hindered from rotating in the downshift direction, by the double-meshing preventing mechanism 200 as the stopper member 206 comes into contact with the stopper surface 208.

When the rack 202 moves in the upshift direction (the rightward direction in the sheet of the drawing), the stopper member 206 moves up the inclined surface 210, so that the rack 202 is allowed to move in the upshift direction. In other words, the transmission 10 is allowed to upshift. Thus, when no switching current is supplied to the solenoid 116 of the switching actuator 104, the stopper member 206 is moved to the first position indicated by the solid line in FIG. 17, so that the double-meshing preventing mechanism 200 is switched to the one-way state in which the rack 202 is hindered from moving in the downshift direction (in other words, the switching mechanism 28 is hindered from moving in the downshift direction) while the rack 202 is allowed to move in the upshift direction (in other words, the switching mechanism 28 is allowed to move in the upshift direction).

On the other hand, when a switching current is supplied to the solenoid 116 of the switching actuator 104, the rod 110 moves in the direction of extending from the case 106 against the urging force of the spring 112. Then, the stopper member 206 coupled to the distal end of the rod 110 is turned in the counterclockwise direction around the turning portion 206a, and the stopper member 206 assumes a second position indicated by the dashed line in FIG. 17. When the stopper member 206 is in the second position indicated by the dashed line in FIG. 17, the stopper member 206 does not come into contact with the stopper surface 208 of the ratchet tooth 204 regardless of the direction in which the rack 202 moves, so that the rack 202 is allowed to move in both the upshift direction and the downshift direction. Thus, when a switching current is supplied to the switching actuator 104, the double-meshing preventing mechanism 200 is switched to the free state in which the rack 202 is allowed to move in both the upshift direction and the downshift direction, i.e., the switching mechanism 28 is allowed to move in both the upshift direction and the downshift direction.

The barrel 40 is provided with the detent mechanism 130. Since the structure and operation of the detent mechanism 130 are the same as in the above embodiment, the description thereof will be omitted.

The operation of the double-meshing preventing mechanism 200 configured as described above will be described. During travel in a state where the transmission 10 is shifted to a predetermined gear stage, no switching current is supplied from the electronic control unit 92 to the solenoid of the switching actuator 104. Therefore, the stopper member 206 of the double-meshing preventing mechanism 200 is turned to the first position indicated by the solid line in FIG. 17 and the double-meshing preventing mechanism 200 is thereby switched to the one-way state, so that the rack 202 is hindered from moving in the downshift direction and allowed to move in the upshift direction. Here, even when the rack 202 moves in the downshift direction of the transmission 10 due to malfunction of the electronic control unit 92, failure of the electrically operated actuator 90, etc., the rack 202 is hindered from moving in the downshift direction as the stopper member 206 and the stopper surface 208 of the ratchet tooth 204 come into contact with each other. As a result, the switching mechanism 28 is hindered from moving in the downshift direction, and double meshing resulting from the switching mechanism 28 moving accidentally in the downshift direction is prevented.

When the transmission 10 is to be downshifted, a switching current is supplied from the electronic control unit 92 to the solenoid 116 of the switching actuator 104. Then, the switching actuator 104 operates so as to turn the stopper member 206 to the second position indicated by the dashed line in FIG. 17, so that the double-meshing preventing mechanism 200 is switched to the free state. Thus, the transmission 10 is allowed to downshift, and the transmission 10 is downshifted. Also in the double-meshing preventing mechanism 200, when the transmission 10 is to be downshifted, the same control as in the above embodiment is executed to reliably prevent double meshing during a transition period of a downshift.

As described above, also when the ratchet teeth 204 are formed in the rack 202 as in the double-meshing preventing mechanism 200 of this embodiment, the same effects as in the above embodiment can be produced.

While the embodiments of the disclosure have been described in detail above based on the drawings, the disclosure can be implemented also in other forms.

For example, the transmission 10 can shift to six forward gear stages in the above embodiments, but the number of gear stages is not necessarily limited to six. The number of gear stages of the transmission can be changed as necessary, for example, to five forward gear stages.

The switching mechanism 28 is provided on the output shaft 22 in the above embodiments, but the switching mechanism 28 may be provided on the counter shaft 20.

The operation of the switching actuator 104 is electrically controlled in the above embodiments, but the operation thereof may be hydraulically controlled.

In the above embodiments, the first switching mechanism 28*a* is disposed between the input gear 30*a* and the second-speed gear 30*b*, and has the first meshing teeth 66*a* and the fourth meshing teeth 76*a* that can mesh with the gear-side meshing teeth 70*a* of the input gear 30*a*, and the third meshing teeth 72*a* and the second meshing teeth 68*a* that can mesh with the gear-side meshing teeth 70*b* of the second-speed gear 30*b*. However, the switching mechanism may be configured to be able to mesh with one speed-changing gear. For example, the first switching mechanism 28*a* may have the first meshing teeth 66*a* and the fourth meshing teeth 76*a* and may not have the second meshing teeth 68*a* and the third meshing teeth 72*a*. Thus, the switching mechanism may be configured to be able to connect and disconnect one speed-changing gear to and from the output shaft.

The engine 12 is used as the power generation device in the above embodiments, but the power generation device in the disclosure is not necessarily limited to an engine. For example, an electric motor may be used as the power generation device.

In the above embodiments, learning may be executed for setting the position b shown in FIG. 11, at which the third meshing teeth 72*a* of the first switching mechanism 28*a* and the gear-side meshing teeth 70*b* of the second-speed gear 30*b* mesh with each other, to an appropriate value according to a change over time. This learning is executed preferably while the vehicle is driven. Similarly, learning may be executed for setting the position d shown in FIG. 12, at which the second meshing teeth 68*a* of the first switching mechanism 28*a* and the gear-side meshing teeth 70*b* of the second-speed gear 30*b* mesh with each other, to an appropriate value according to a change over time. This learning is executed preferably while the vehicle is driven.

The embodiments described above are merely examples of embodiments, and the disclosure can be implemented with various changes and improvements made thereto based on the knowledge of those skilled in the art.

What is claimed is:

1. A vehicle transmission comprising:
a shaft;
a plurality of speed-changing gears provided on the shaft so as to be able to rotate relatively to the shaft;
a plurality of switching mechanisms each of which is disposed at a position adjacent to a corresponding one of the speed-changing gears in an axial direction of the shaft and configured to switch between a connected state in which the corresponding speed-changing gear and the shaft rotate integrally and a disconnected state in which the corresponding speed-changing gear and the shaft rotate relatively to each other; and
a shifting mechanism that applies an operating force for moving the switching mechanisms in the axial direction of the shaft, wherein:
the vehicle transmission is shifted to a plurality of gear stages according to positions of the switching mechanisms;
each of the speed-changing gears includes a plurality of gear-side meshing teeth provided on a surface facing a corresponding one of the switching mechanisms in the axial direction of the shaft;
each of the switching mechanisms includes a first ring that is provided on the shaft so as to be unable to rotate relatively to the shaft and able to move relatively to the shaft in the axial direction of the shaft, a second ring that is provided on the shaft so as to be unable to rotate relatively to the shaft and able to move relatively to the shaft in the axial direction of the shaft, and a spring that is interposed between the first ring and the second ring in the axial direction of the shaft and exerts an urging force in a direction in which the first ring and the second ring are drawn toward each other;

the first ring is disposed at a position adjacent to the corresponding speed-changing gear in the axial direction of the shaft, and the second ring is disposed at a position separated from the corresponding speed-changing gear by the first ring in the axial direction of the shaft;

the first ring includes first meshing teeth that protrude toward the corresponding speed-changing gear from a surface facing the corresponding speed-changing gear in the axial direction of the shaft and are configured to mesh with the gear-side meshing teeth;

the second ring includes second meshing teeth that protrude toward the corresponding speed-changing gear from a surface facing the corresponding speed-changing gear in the axial direction of the shaft by passing through the first ring and are configured to mesh with the gear-side meshing teeth; and the shifting mechanism is provided with a double-meshing preventing mechanism configured to switch between a one-way state in which the switching mechanisms are hindered from moving in a downshift direction and allowed to move in an upshift direction and a free state in which the switching mechanisms are allowed to move in both the downshift direction and the upshift direction.

2. The vehicle transmission according to claim 1, wherein:

the double-meshing preventing mechanism includes a ratchet tooth provided in the shifting mechanism and a stopper member configured to come into contact with the ratchet tooth;

the stopper member is configured to switch between a first position in which the ratchet tooth and the stopper member come into contact with each other and a second position in which the ratchet tooth and the stopper member do not come into contact with each other;

the double-meshing preventing mechanism is switched to the one-way state when the stopper member is switched to the first position; and the ratchet tooth and the stopper member are configured to come into contact with each other when the shifting mechanism operates in a direction of moving the switching mechanisms toward a downshift side in a state where the double-meshing preventing mechanism is switched to the one-way state.

3. The vehicle transmission according to claim 2, wherein:

the shifting mechanism is provided so as to be rotatable;

the shifting mechanism includes a barrel having shift grooves defining positions of shifting forks that are respectively fitted to the switching mechanisms, a pinion provided on the barrel, and a rack including teeth that mesh with the pinion; and the ratchet tooth is provided in the barrel.

4. The vehicle transmission according to claim 3, wherein power transmission between the shaft and the speed-changing gears is interrupted when the stopper member and the ratchet tooth of the double-meshing preventing mechanism are in contact with each other.

5. The vehicle transmission according to claim 4, wherein:

the shifting mechanism is provided with a detent mechanism that restricts a rotation position of the barrel to a position corresponding to any one of the plurality of gear stages;

the detent mechanism includes a detent plate with a detent surface having a shape of a periodically changing wave, and a pressing member that is pressed against the detent surface; and the pressing member is pressed against a surface located closer to a downshift side than an apex provided in the detent surface is, when the stopper member and the ratchet tooth of the double-meshing preventing mechanism are in contact with each other.

6. The vehicle transmission according to claim 2, wherein:

the shifting mechanism is provided so as to be rotatable;

the shifting mechanism includes a barrel having shift grooves defining positions of shifting forks that are respectively fitted to the switching mechanisms, a pinion provided on the barrel, and a rack including teeth that mesh with the pinion; and the ratchet tooth is provided in the rack.

* * * * *